US008638256B2

(12) United States Patent
Alizadeh-Shabdiz et al.

(10) Patent No.: US 8,638,256 B2
(45) Date of Patent: Jan. 28, 2014

(54) ACCURACY AND PERFORMANCE OF A HYBRID POSITIONING SYSTEM

(75) Inventors: Farshid Alizadeh-Shabdiz, Wayland, MA (US); Mohammad A. Heidaran, Worcester, MA (US)

(73) Assignee: Skyhook Wireless, Inc., Boston, MA (US)

( * ) Notice: Subject to any disclaimer, the term of this patent is extended or adjusted under 35 U.S.C. 154(b) by 292 days.

(21) Appl. No.: 12/569,106

(22) Filed: Sep. 29, 2009

(65) Prior Publication Data

US 2011/0074626 A1    Mar. 31, 2011

(51) Int. Cl.
    *G01S 19/48*    (2010.01)
(52) U.S. Cl.
    USPC .................................................. 342/357.31
(58) Field of Classification Search
    USPC .................................................. 342/357.31
    See application file for complete search history.

(56) References Cited

U.S. PATENT DOCUMENTS

| | | | |
|---|---|---|---|
| 3,881,060 A | 4/1975 | Connell et al. |
| 4,310,726 A | 1/1982 | Asmuth |
| 4,415,771 A | 11/1983 | Martinez |
| 4,757,267 A | 7/1988 | Riskin |
| 4,876,550 A | 10/1989 | Kelly |
| 4,924,491 A | 5/1990 | Compton et al. |
| 5,043,736 A | 8/1991 | Darnell et al. |
| 5,095,505 A | 3/1992 | Finucane et al. |
| 5,119,504 A | 6/1992 | Durboraw, III |
| 5,136,636 A | 8/1992 | Wegrzynowicz |
| 5,161,180 A | 11/1992 | Chavous |
| 5,235,630 A | 8/1993 | Moody et al. |
| 5,235,633 A | 8/1993 | Dennison et al. |
| 5,315,636 A | 5/1994 | Patel |
| 5,334,974 A | 8/1994 | Simms et al. |
| 5,353,023 A | 10/1994 | Mitsugi |
| 5,379,337 A | 1/1995 | Castillo et al. |

(Continued)

FOREIGN PATENT DOCUMENTS

| | | |
|---|---|---|
| CA | 2056203 A1 | 7/1992 |
| EP | 0493896 A2 | 7/1992 |

(Continued)

OTHER PUBLICATIONS

Wikipedia, "Dilution of Precision (GPS)," May 2009, 3 pages, http://web.archive.org/web/20090516014557/http://en.wikipedia.org/wiki/Dilution_of_pre...7/28/2011.

(Continued)

*Primary Examiner* — Jack W Keith
*Assistant Examiner* — Frank J McGue
(74) *Attorney, Agent, or Firm* — Wilmer Cutler Pickering Hale and Dorr LLP

(57) ABSTRACT

The present disclosure relates to a method for determining the position of a WLAN positioning system (WPS) and satellite positioning system (SPS) enabled device. The method can include determining an initial WPS position of the device using WPS, calculating an error region around the initial WPS position of the device, dividing the error region into a plurality of points, obtaining satellite measurements from at least two satellites in view of the device, determining a variation in a receiver clock bias for each point within the error region based on the satellite measurements from at least two satellites, selecting the point with the lowest variation in the receiver clock bias, and determining whether or not to use the point with the lowest variation in receiver clock bias to refine the initial WPS position of the device.

19 Claims, 9 Drawing Sheets

(56) References Cited

U.S. PATENT DOCUMENTS

| | | |
|---|---|---|
| 5,389,935 A | 2/1995 | Drouault et al. |
| 5,414,432 A | 5/1995 | Penny, Jr. et al. |
| 5,420,592 A | 5/1995 | Johnson |
| 5,564,121 A | 10/1996 | Chow et al. |
| 5,936,572 A | 8/1999 | Loomis et al. |
| 5,940,825 A | 8/1999 | Castelli et al. |
| 5,943,606 A | 8/1999 | Kremm et al. |
| 5,999,124 A | 12/1999 | Sheynblat |
| 6,134,448 A | 10/2000 | Shoji et al. |
| 6,185,427 B1 | 2/2001 | Krasner et al. |
| 6,192,312 B1 | 2/2001 | Hummelsheim |
| 6,272,405 B1 | 8/2001 | Kubota et al. |
| 6,420,999 B1 | 7/2002 | Vayanos |
| 6,484,034 B1 | 11/2002 | Tsunehara et al. |
| 6,574,557 B2 * | 6/2003 | Endo .......................... 701/213 |
| 6,587,692 B1 | 7/2003 | Chen et al. |
| 6,664,925 B1 | 12/2003 | Moore et al. |
| 6,674,403 B2 | 1/2004 | Gray et al. |
| 6,678,611 B2 | 1/2004 | Khavakh et al. |
| 6,707,422 B2 | 3/2004 | Sheynblat et al. |
| 6,725,158 B1 * | 4/2004 | Sullivan et al. ............... 701/213 |
| 6,754,488 B1 | 6/2004 | Won et al. |
| 6,771,211 B2 | 8/2004 | Syrjarinne et al. |
| 6,799,049 B1 | 9/2004 | Zellner et al. |
| 6,862,524 B1 | 3/2005 | Nagda et al. |
| 6,888,811 B2 | 5/2005 | Eaton et al. |
| 6,894,645 B1 | 5/2005 | Akopian et al. |
| 6,928,292 B2 | 8/2005 | Tsunehara et al. |
| 6,975,266 B2 | 12/2005 | Abraham et al. |
| 6,978,023 B2 | 12/2005 | Dacosta |
| 6,990,351 B2 | 1/2006 | Tsunehara et al. |
| 6,990,428 B1 | 1/2006 | Kaiser et al. |
| 7,086,089 B2 | 8/2006 | Hrastar et al. |
| 7,116,988 B2 | 10/2006 | Dietrich et al. |
| 7,120,449 B1 | 10/2006 | Muhonen et al. |
| 7,123,928 B2 | 10/2006 | Moeglein et al. |
| 7,130,642 B2 | 10/2006 | Lin |
| 7,130,646 B2 | 10/2006 | Wang |
| 7,151,939 B2 | 12/2006 | Sheynblat |
| 7,155,239 B2 | 12/2006 | Zeng et al. |
| 7,221,928 B2 | 5/2007 | Laird et al. |
| 7,236,126 B2 | 6/2007 | Jeon et al. |
| 7,242,950 B2 | 7/2007 | Suryanarayana et al. |
| 7,250,907 B2 | 7/2007 | Krumm et al. |
| 7,254,405 B2 | 8/2007 | Lin et al. |
| 7,257,411 B2 | 8/2007 | Gwon et al. |
| 7,277,404 B2 | 10/2007 | Tanzella et al. |
| 7,299,058 B2 | 11/2007 | Ogino |
| 7,305,245 B2 | 12/2007 | Alizadeh-Shabdiz et al. |
| 7,313,402 B1 | 12/2007 | Rahman |
| 7,319,878 B2 | 1/2008 | Sheynblat et al. |
| 7,373,154 B2 | 5/2008 | Sharony et al. |
| 7,389,114 B2 | 6/2008 | Ju et al. |
| 7,397,424 B2 | 7/2008 | Houri |
| 7,403,762 B2 | 7/2008 | Morgan et al. |
| 7,412,246 B2 | 8/2008 | Lewis et al. |
| 7,414,988 B2 | 8/2008 | Jones et al. |
| 7,426,197 B2 | 9/2008 | Schotten et al. |
| 7,433,694 B2 | 10/2008 | Morgan et al. |
| 7,433,696 B2 | 10/2008 | Dietrich et al. |
| 7,440,755 B2 | 10/2008 | Balachandran et al. |
| 7,471,954 B2 | 12/2008 | Brachet et al. |
| 7,474,897 B2 | 1/2009 | Morgan et al. |
| 7,479,922 B2 | 1/2009 | Hunt et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,519,372 B2 | 4/2009 | MacDonald et al. |
| 7,522,908 B2 | 4/2009 | Hrastar |
| 7,525,484 B2 | 4/2009 | Dupray et al. |
| 7,545,894 B2 | 6/2009 | Ziedan et al. |
| 7,551,579 B2 | 6/2009 | Alizadeh-Shabdiz et al. |
| 7,551,929 B2 | 6/2009 | Alizadeh-Shabdiz et al. |
| 7,587,081 B2 * | 9/2009 | Rovira-Mas et al. ......... 382/154 |
| 7,595,754 B2 | 9/2009 | Mehta |
| 7,660,588 B2 | 2/2010 | Sheynblat et al. |
| 7,664,511 B2 | 2/2010 | Wang et al. |
| 7,672,675 B2 | 3/2010 | Pande et al. |
| 7,683,835 B2 | 3/2010 | Sharma |
| 7,724,612 B2 | 5/2010 | Azim |
| 7,764,231 B1 | 7/2010 | Karr et al. |
| 7,768,963 B2 | 8/2010 | Alizadeh-Shabdiz |
| 7,769,396 B2 | 8/2010 | Alizadeh-Shabdiz et al. |
| 7,818,017 B2 | 10/2010 | Alizadeh-Shabdiz et al. |
| 7,822,427 B1 | 10/2010 | Hou |
| 7,835,754 B2 | 11/2010 | Alizadeh-Shabdiz et al. |
| 7,848,733 B2 | 12/2010 | Bull et al. |
| 7,853,250 B2 | 12/2010 | Harvey et al. |
| 7,856,209 B1 | 12/2010 | Rawat |
| 7,856,234 B2 | 12/2010 | Alizadeh-Shabdiz et al. |
| 8,130,148 B2 | 3/2012 | Alizadeh-Shabdiz |
| 8,154,454 B2 | 4/2012 | Alizadeh-Shabdiz |
| 8,223,074 B2 | 7/2012 | Alizadeh-Shabdiz |
| 8,242,960 B2 | 8/2012 | Alizadeh-Shabdiz |
| 2003/0011511 A1 | 1/2003 | King et al. |
| 2003/0043073 A1 | 3/2003 | Gray et al. |
| 2003/0125045 A1 | 7/2003 | Riley et al. |
| 2003/0146835 A1 | 8/2003 | Carter |
| 2003/0186679 A1 | 10/2003 | Challener et al. |
| 2003/0197645 A1 | 10/2003 | Ninomiya et al. |
| 2003/0225893 A1 | 12/2003 | Roese et al. |
| 2004/0019679 A1 | 1/2004 | E et al. |
| 2004/0023669 A1 | 2/2004 | Reddy |
| 2004/0039520 A1 | 2/2004 | Khavakh et al. |
| 2004/0048640 A1 | 3/2004 | Bae |
| 2004/0072577 A1 | 4/2004 | Myllymaki et al. |
| 2004/0087317 A1 | 5/2004 | Caci |
| 2004/0124977 A1 | 7/2004 | Biffar |
| 2004/0160909 A1 | 8/2004 | Sheynblat |
| 2004/0205234 A1 | 10/2004 | Barrack et al. |
| 2005/0017898 A1 | 1/2005 | Teranishi |
| 2005/0020266 A1 | 1/2005 | Backes et al. |
| 2005/0037775 A1 | 2/2005 | Moeglein et al. |
| 2005/0090266 A1 | 4/2005 | Sheynblat |
| 2005/0105600 A1 | 5/2005 | Culum et al. |
| 2005/0108306 A1 | 5/2005 | Martizano Catalasan |
| 2005/0164710 A1 | 7/2005 | Beuck |
| 2005/0192024 A1 | 9/2005 | Sheynblat |
| 2005/0227711 A1 | 10/2005 | Orwant et al. |
| 2005/0237967 A1 | 10/2005 | Lee et al. |
| 2005/0285783 A1 | 12/2005 | Harper |
| 2006/0009235 A1 | 1/2006 | Sheynblat et al. |
| 2006/0046709 A1 | 3/2006 | Krumm et al. |
| 2006/0049982 A1 | 3/2006 | Wells |
| 2006/0063560 A1 | 3/2006 | Herle |
| 2006/0089157 A1 | 4/2006 | Casey et al. |
| 2006/0089160 A1 | 4/2006 | Othmer |
| 2006/0170591 A1 | 8/2006 | Houri |
| 2006/0193258 A1 | 8/2006 | Ballai |
| 2006/0194568 A1 | 8/2006 | Sharony |
| 2006/0197704 A1 | 9/2006 | Luzzatto et al. |
| 2007/0004428 A1 | 1/2007 | Morgan et al. |
| 2007/0052583 A1 | 3/2007 | Zhodzishsky et al. |
| 2007/0077945 A1 | 4/2007 | Sheynblat |
| 2007/0109184 A1 | 5/2007 | Shyr et al. |
| 2007/0121560 A1 * | 5/2007 | Edge .......................... 370/338 |
| 2007/0126635 A1 | 6/2007 | Houri |
| 2007/0150516 A1 | 6/2007 | Morgan et al. |
| 2007/0167174 A1 | 7/2007 | Halcrow et al. |
| 2007/0216540 A1 | 9/2007 | Riley et al. |
| 2007/0217374 A1 | 9/2007 | Waxman |
| 2007/0244631 A1 | 10/2007 | Jung et al. |
| 2007/0258420 A1 | 11/2007 | Alizadeh-Shabdiz et al. |
| 2007/0268177 A1 | 11/2007 | Ahmed et al. |
| 2007/0279281 A1 | 12/2007 | Oda et al. |
| 2007/0286213 A1 | 12/2007 | Fodor et al. |
| 2007/0298761 A1 | 12/2007 | Bani Hani |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0032706 A1 | 2/2008 | Sheynblat et al. |
| 2008/0033646 A1 | 2/2008 | Morgan et al. |

(56) References Cited

U.S. PATENT DOCUMENTS

| | | | |
|---|---|---|---|
| 2008/0079633 A1 | 4/2008 | Pon et al. |
| 2008/0111737 A1 | 5/2008 | Haverkamp et al. |
| 2008/0137626 A1 | 6/2008 | Choi et al. |
| 2008/0158053 A1* | 7/2008 | Watanabe | 342/357.15 |
| 2008/0176583 A1 | 7/2008 | Brachet et al. |
| 2008/0214192 A1 | 9/2008 | Soliman |
| 2008/0234533 A1 | 9/2008 | Vollum |
| 2008/0248741 A1 | 10/2008 | Alizadeh-Shabdiz |
| 2008/0248808 A1 | 10/2008 | Alizadeh-Shabdiz |
| 2008/0248809 A1 | 10/2008 | Gower |
| 2008/0261615 A1 | 10/2008 | Kalhan |
| 2009/0002237 A1 | 1/2009 | Nonoyama |
| 2009/0017841 A1 | 1/2009 | Lewis et al. |
| 2009/0042557 A1 | 2/2009 | Vardi et al. |
| 2009/0075672 A1 | 3/2009 | Jones et al. |
| 2009/0103503 A1 | 4/2009 | Chhabra |
| 2009/0121927 A1 | 5/2009 | Moshfeghi |
| 2009/0149197 A1 | 6/2009 | Morgan et al. |
| 2009/0154371 A1 | 6/2009 | Alizadeh-Shabdiz et al. |
| 2009/0161806 A1 | 6/2009 | Ananny et al. |
| 2009/0168843 A1 | 7/2009 | Waters et al. |
| 2009/0175189 A1 | 7/2009 | Alizadeh-Shabdiz et al. |
| 2009/0181695 A1 | 7/2009 | Wirola et al. |
| 2009/0187983 A1 | 7/2009 | Zerfos et al. |
| 2009/0189810 A1 | 7/2009 | Murray |
| 2009/0192709 A1 | 7/2009 | Yonker et al. |
| 2009/0196267 A1 | 8/2009 | Walker, Sr. |
| 2009/0231191 A1 | 9/2009 | Wu et al. |
| 2009/0251364 A1 | 10/2009 | Lorenz |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0039323 A1 | 2/2010 | Kosolobov et al. |
| 2010/0052983 A1 | 3/2010 | Alizadeh-Shabdiz |
| 2010/0195632 A1 | 8/2010 | Prabhu |
| 2010/0309051 A1 | 12/2010 | Moshfeghi |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298660 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0021759 A1 | 1/2012 | Chen et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0196621 A1 | 8/2012 | Alizadeh-Shabdiz et al. |

FOREIGN PATENT DOCUMENTS

| | | |
|---|---|---|
| EP | 1359714 A2 | 11/2003 |
| JP | 03-235562 A | 10/1991 |
| JP | 04-035345 A | 2/1992 |
| WO | WO-03021851 | 3/2003 |
| WO | WO-04/002185 A1 | 12/2003 |
| WO | WO-2005004527 A1 | 1/2005 |
| WO | WO-2008/006077 A2 | 1/2008 |
| WO | WO-2009/149417 | 12/2009 |
| WO | WO-2010/005731 | 1/2010 |
| WO | WO-2011/008613 | 1/2011 |
| WO | WO-2011/041298 | 4/2011 |
| WO | WO-2012/061595 | 5/2012 |

OTHER PUBLICATIONS

Griswold, et al., "ActiveCamus—Sustaining Educational Communities through Mobile Technology," UCSD CSE Technical Report #CS200-0714, 2002, 19 pages.

Hazas, M., et al., "Location-Aware Computing Comes of Age," IEEE, vol. 37, Feb. 2004, 3 pages.

Hellebrandt, M. et al., "Estimating Position and Velocity of Mobile in a Cellular Radio Network," IEEE Transactions on Vehicular Technology, vol. 46, No. 1, Feb. 1997, 7 pages.

International Search Report and Written Opinion of the International Searching Authority for PCT/US2009/046504, mailed Oct. 7, 2009, 12 pages.

International Search Report and Written Opinion of the International Searching Authority of the United States Patent and Trademark Office for PCT/US2010/041282, mailing date of Aug. 30, 2010, 8 pages.

International Search Report and Written Opinion of the International Searching Authority, mailing date Aug. 18, 2009 for PCT/US09/047527, 10 pages.

International Search Report and Written Opinion of the International Searching Authority, the United States Patent and Trademark Office, for International Application No. PCT/US2010/050511, dated Dec. 30, 2010, 8 pages.

International Search Report and Written Opinion of the International Searching Authority, the United States Patent and Trademark Office, for International Application No. PCT/US2010/050742, dated Dec. 3, 2010, 9 pages.

Kim, M. et al., "Risks of Using AP Locations Discovered Through War Driving," Lecture Notes in Computer Science, vol. 3968, 2006, 15 pages.

Kirsner, S., "One More Way to Find Yourself," The Boston Globe, May 23, 2005, Retrieved from www.boston.com, 2 pages.

Krumm, J. et al., "LOCADIO: Interferring Motion and Location from Wi-Fi Signal Strengths," First Annual International Conference and Mobile and Ubiquitous Systems: Networking and Services, Aug. 2004, 10 pages.

Lamarca, A. et al., "Place Lab: Device Positioning Using Radio Beacons in the Wild," Intel Corporation, 2004, 20 pages.

Muthukrishnan, K. et al., "Towards Smart Surroundings: Enabling Techniques and Technologies for Localization," Lecture Notes in Computer Science, vol. 3479, May 2005, 11 pages.

"A Practical Approach to Identifying and Tracking Unauthorized 802.11 Cards and Access Points," Interlink Networks, 2002, 20 pages.

"Best Practices for Hunting Down & Terminating Rogue Wireless LANs (WLANs)," AirDefense, Inc., available at www.airdefense.net, 2002-2005, 7 pages.

"Calculate AP Physical Location," NetStumbler.org Forums, Oct. 2012, 7 pages, available at http://www.netstumbler.org/netsstumbler/calculate-ap-physical-location-t9813.html.

"Current Kismet Readme," Kismet, Nov. 2012, 47 pages, available at http://kismetwireless.net/documentation.shtml.

"Distributed Wireless Security Auditor," IBM Research, Nov. 2012, 3 pages, available at http://www.research.ibm.com/gsal/dwsa.

"Ekahau Positioning Engine 2.0: 802.11-based Wireless LAN Positiioning System," Ekahau Technology Document, Nov. 2002, 19 pages.

"GPSDRIVE," Nov. 2012, available at http://gpsdrive.sourceforge.net/gpsdrive_manual-en.html, 13 pages.

"Indoor Radio Propagation," Spread Spectrum Scene, , Nov. 2012, 7 pages, available at http://sss-mag.com/indoor.html.

(56) References Cited

OTHER PUBLICATIONS

Adelstein et al., "Physically Locating Wireless Intruders," Journal of Universal Computer Science, vol. 11, No. 1, 2005, pp. 4-19.

Ambrosch et al., The Intelligent Network, a Joint Study by Bell Atlantic, IBM and Siemens, Springer-Verlag, IBSN 3-540-50897-X, 1989, Chapter 9, 18 pages.

Author Unknown, "LocalePoints," Newbury Networks, available at least as early as Oct. 2004, at http://replay.waybackmachine.org/20041009170934/hhttp://www.newburynetworks.com/products/coretech.php?localepoints, last accessed Apr. 14, 2011, 1 page.

Author Unknown, "LocaleServer," Newbury Networks, available at least as early as Oct. 2004, at http://replay.waybackmachine.org/20041010054718/http://www.newburynetworks.com/products/coretech.php, last accessed Apr. 14, 2011, 1 page.

Author Unknown, "Mobile Applications Suite," Pango, PanGo Mobile Applications Suite, available at leasst as early as Aug. 2003, at http://replay.waybackmachine.org/20030825161534/http://pangonetworks.com/mobile.htm and http://replay.waybackmachine.org/20031002103310/http://pangonetworks.com/products.htm, last accessed Apr. 14, 2011, 1 page.

Author Unknown, "Proximity Platform," Pango, PanGo Mobile Applications Suite, available at leasst as early as Aug. 2003, at http://replay.waybackmachine.org/20031002102757/http://pangonetworks.com/proximity.htm and http://replay.waybackmachine.org/20031002103310/http://pangonetworks.com/products.htm, last accessed Apr. 14, 2011, 1 page.

Author Unknown, Bluesoft, Inc., Aeroscout, available at http://replay.waybackmachiine.org/20030802052607/http:/bluesoft-inc.com/wlan.asp, Accessed on Apr. 14, 2011, 1 page.

Author Unknown, Netstumbler Blog Posting, "Wardriving as a Proxy for Wi-Fi Location," available at http://www.netstumbler.org/news/wardriving-as-a-proxy-for-wi-fi-gps-location-t10762.html, May 11, 2004-May 17, 2004, last accessed Apr. 13, 2004, 7 pages.

Bahl et al., "RADAR: An In-Building RF-based User Location and Tracking System," Proceedings IEEE INFOCOM 2000, pp. 775-784.

Balachandran et al., "Wireless Hotspots: Current Challenges and Future Directions," WMASH'03, Sep. 2003, 9 pages.

Battiti, et al., "Wireless LANs: From WarChalking to Open Access Networks," Mobile Networks and Applications 10, pp. 275-287, 2005.

Bhasker et al., "Employing User Feedback for Fast, Accurate, Low-Maintenance Geolocationing," Proceeding PERCOM '04 Proceedings of the Second IEEE International Conference on Pervasive Computing and Communications (PerCom'04), IEEE Computer Society Washington, DC., USA, 2004, 10 pages.

Bjorndahl et al., "CME20—A Total Solution for GSM Networks," Ericsson Review No. 3, 1991, 8 pages.

Bogue, "Using NetStumbler and MiniStumbler to Find Rogue Access Points on Wireless Networks," TechRepublic, CIO Top 50 6th Annual Event, 2012, 5 pages.

Branch et al., "Autonomic 802.11 Wireless LAN Security Auditing," IEEE Computer Society, 2004, pp. 56-65.

Brewin, "IBM Develops Tool to Detect Rogue Wireless LAN Access Points," Nov. 2012, 5 pages, available at http://www.computerworld.com/s/article/72065/IBM_develops_tool_to_detect_rogue_wi.

Buccafurno, "The Philadelphia Story," TE&M Special Report 911, Dec. 1987, pp. 68-72.

Byers et al., "802.11B Access Point Mapping," Communications of the ACM, May 2003, vol. 46, No. 5, pp. 41-46.

California Legislature, Senate on Energy and Public Utilities, Joint Interim Hearing on the 911 Emergency Responsne System—An Overview of its Effectiveness, Nov. 21, 1990, 107 pages.

Capkun et al., "GPS-free Positioning in Mobile Ad Hoc Networks," Cluster Computing, 5, pp. 157-167, 2002.

Castro, "A Probablistic Room Location Service for Wireless Networked Environments," Ubicomp 2001: Ubiquitous Computing, International Conference, Atlanta, Georgia, Sep. 30-Oct. 2, 2001, Proceedings, 10 pages.

Chawathe et al., "A Case Study in Building Layered DHT Applications," SIGCOMM '05 Proceedings of the 2005 Conference on Applications, Technologies, Architectures, and Protocols for Computer Communications, pp. 97-108, Jan. 2005, 15 pages.

Cheng et al., "Accuracy Characterization for Metropolitan-scale Wi-Fi Localization," MobiSys '05 Proceedings of the 3rd International Conference on Mobile Systems, Applications, and Services, pp. 233-245, 13 pages.

Connelly et al., "A Toolkit for Automatically Constructing Outdoor Radio Maps," Proceedings of the International Conference on Information Technology: Coding and Computing, ITCC, Apr. 4-6, 2005, Las Vegas, Nevada, IEEE, 7 pages.

Crow, "Auditing for Rogue Wireless Access Points in a Large Corporate Campus," Global Information Assurance Certification Paper, Sep. 18, 2003, 21 pages.

Dayharsh, et al., "Update on the National Emergency No. 911," IEEE Transactions on Vehicular Technology, vol. VT-28, No. 4, Nov. 1979, pp. 292-297.

Delong, "Making 911 Even Better," Telephony Integrating Voice and Data Communications, Telephoney, Dec. 1987, 6 pages.

DeNigris et al., "Ehanced 911: Emergency Calling With a Plus," Bell Laboratories Record, Mar. 1980, 6 pages.

Eckerson, "Users Test Toll-Free Net Access Options," Management Strategies, Network World, Dec. 1991/Jan. 1992, pp. 17-18.

Ekahau Client 3.0 Build 136 Release Notes, Available at http://replay.waybackmachine.org/20030929003821/http:/www.ekahau.com/products/client, Apr. 14, 2011, 4 pages.

Ekahau, "Ekahau Site Survey 1.0, Maximize Coverage—Minimize Channel Interference," Available at http://replay.waybackmachine.org/20030807204446/http:/www.ekahau.com/products/siites, Apr. 14, 2011, 2 pages.

Ekahau, "Technology Overview", Available at http://replay.waybackmachine.org/20031008125411/http:/www.ekahau.com/products, Apr. 14, 2011, 8 pages.

Ekahau, "Technology Overview," Available at http://replay.waybackmachine.org/2003/20031008125411/http:/www.ekahau.com/products, Apr. 14, 2011, 1 page.

Ekahau, "Why Ekahau Site Survey?," Available at http://replay.waybackmachine.org/20030801080918/http:/www.ekahau.com/products/sites, Apr. 14, 2011, 1 page.

Ellison, "Exploiting and Protecting 802.11b Wireless Networks," Nov. 2012, 8 pages, available at http://www.extremetech.com/computing/57646-exploiting-and-protecting-80211b-wireless.

Elnahrawy, et al., "Using Area-Based Presentations and Metrics for Localization Systems in Wireless LANs," Proceedings of the 29th Conference on Local Computer Networks, IEEE, LCN 2004, Tampa, Florida, Nov. 16-18, 2004, 9 pages.

Etter, "A Guide to Wardriving and Detecting Wardrivers," SANS Institute InfoSec Reading Room, 2002, 16 pages.

Foust, "identifying and Tracking Unauthorized 802.11 Cards and Access Points," The Magazine of Usenix & Sage, Aug. 2002, vol. 27, No. 4, 13 pages.

Frederickson, "Approximation Algorithms for Some Postman Problems," Journal of the Association for Computing Machinery, vol. 26, No. 3, Jul. 1979, pp. 538-554.

Griswold et al., "ActiveCampus—Sustaining Educational Communities through Mobile Technology," UCSD CSE Technical Report, 2002, 19 pages.

Griswold et al., "ActiveCampus: Experiments in Community-Oriented Ubiquitous Computing," IEEE, Oct. 2004, pp. 73-81.

Harvey et al., "Call Center Solutions," AT&T Technical Journal, Sep./Oct. 1991, 11 pages.

Hatami et al., "A Comparative Performance Evaluation of RSS-Based Positioning Algorithms Used in WLAN Networks," 2005 IEEE Wireless Communications and Networking Conference, Mar. 13-17, 2005, New Oreleans, LA, 8 pages.

Head, "Intelligent Network: A Distributed System," IEEE Communications Magazine, Dec. 1988, 5 pages.

Henderson et al., "The Changing Usage of a Mature Campus-Wide Wireless Network," MobiCom '04, Sep. 26-Oct. 1, 2004, 15 pages.

Hightower et al., "A Survey and Taxonomy of Location Systems for Ubiquitous Computing," Technical Report UW-CSE 01-08-03, Aug. 2001, 29 pages.

Hightower et al., "Location Sensing Techniques," IEEE Computer Magazine, Aug. 2001, 8 pages.

(56) References Cited

OTHER PUBLICATIONS

Hightower et al., "The Location Stack," Intel Research Seattle, Dieter Fox, University of Washington, IRS-TR-03-008, Jul. 2003, 13 pages.
Hong et al., "Privacy and Client-Based Discovery of Location," 10 pages, retrieved at http://www.cs.cmu.edu/jasonh/publications/, Dec. 8, 2003.
Hong et al., "Privacy and Security in the Locatin-Enhanced World Wide Web," In Proceedings of the Workshop on Privacy at Ubicomp 2003, Oct. 2003, 5 pages.
Honig, "The Realities of Service Creation on Switching Systems Through Attached Processors," XIII International Switching Symposium, Session B9, Paper #4, Proceedings vol. VI, May 27-Jun. 1, 1990, 4 pages.
Huffman Coding, Wikipedia, accessed at http://en.wikipedia.org/wiki/Huffman_coding on Dec. 28, 2010. 10 pages.
Hunter, "The Sources of Innovation in New Jersey Bell Switching Services," Master of Science Thesis, Massachusetts Institute of Technology, Sloan School of Management, Jun. 1991, 105 pages.
Hurley, et al., "WarDriving: Drive, Detect, Defend, A Guide to Wireless Security," Syngress Publishing, Nov. 2012, 3 pages, available at http://net-security.org/review.php?id=144.
Jin et al., "802.11-based Positioning System for Context Aware Applications," IEEE, 2003, pp. 929-933.
Kang et al., "Extracting Places from Traces of Locations," WMASH '04 Proceedings of the 2nd ACM International Workshop on Wireless Mobile Applications and ervices on WLAN Hotspots, Oct. 2004, pp. 110-118.
Kawabata et al., "Estimating Velocity Using Diversity Reception," IEEE, 1994, 4 pages.
Kent et al., "Position Estimation of Access Points in 802.11 Wireless Networks," White Paper, Sep. 2003, Lawrence Livermore National Laboratory, Livermore, California, 10 pages.
Kirtner, et al., "The Application of Land Use/Land Cover Data to Wirleess Communication System Design," Proceedings of the ESRI User Conference, 1998, 16 pages.
Komar et al., "Location Tracking and Location Based Service Using IEEE 802.11 WLAN Infrastructure," European Wireless 2004, Feb. 24-27, 2004, 7 pages.
Krumm et al., "The NearMe Wireless Proximity Server," UbiComp 2004, LNCS 3205, pp. 283-300.
Kwan, "GLOBALSTAR: Linking the World via Mobile Connections," IEEE Intl. Symposium on Personal, Indoor & Mobile Radio Communications, pp. 318-223, Sep. 25, 1991.
Kwan, "Graphic Programming Using Odd or Even Points," Chinese Mathematics, vol. 1, No. 3, 1962, Translation of ACTA Mathematica Sinica, 10, No. 3, 1960, 7 pages.
Lackey et al., "Wireless Intrusion Detection," Apr. 2003, IBM Global Services, 16 pages, retrieved from www.forum-intrusion.com/wireless_intrusion_detection.pdf.
LaMarca et al., "Place Lab's First Step: A Location-Enhanced Conference Guide," IEEE Spectrum at 51-54, Dec. 2004, 3 pages.
LaMarca et al., "Place Lab: Bootstrapping Where-ware," Place Lab, Jul. 23, 2011, 19 pages, retrieved from www.placelab.org.
LaMarca et al., "Self-Mapping in 802.11 Location Systems," Intel Corporation, 2005, 18 pages.
LaMarca, et al., "Finding Yourself," IEEE Spectrum, Dec. 2004, 3 pages.
LaMarca, et al., Device Positioning Using Radio Beacons in the Wild, Oct. 2004. 20 pages.
Lee, "Wireless Surveying on the Pocket PC," May 2004, 7 pages, available at http://www.oreillynet.com/lpt/a/4876.
Leslie, "Rogue Wireless Access Point Detection and Remediation," Global Information Assurance Certification Paper, Sep. 2004, 15 pages, retrieved from www.giac.org/paper/gsec/4060/rogue-wireless-access-point-detection-remediation/106460.
Letchner et al., "Large-Scale Localization from Wireless Signal Strength," In Proc. Of the National Conference on Artificial Intelligence (AAAI), 2005, 6 pages.

Lorincz, et al., "MoteTrack: A Robust, Decentralized Approach to RF-Based Location Tracking," First International Workshop, LoCA 2005, LNCS 3479, Oberpfaffenhofen, Germany, May 12-13, 2005 Proceedings, 21 pages.
Mallinder, "The Final Count-Down to GSM, GSM System Aspects," 1991 Pan European Digital Cellular Radio Conference, Feb. 5-6, 1991, Acropolis Conference Centre, Nice, France, 12 pages.
Milner, "NetStumbler v0.4.0 Release Notes," available at http://downloads.netstumbler.com/downloads/netstumbler_v0.4.0_release_notes.pdf, Apr. 18, 2007, 10 pages.
Myllymaki et al., "Location Aggregation from Multiple Sources," IBM Almaden Research Center, MDM '02 Proceedings of the Third International Conference on Mobile Data Management, pp. 131-138, IEEE Computer Society Washington, DC, 2002.
Papadimitriou, "On the Complexity of Edge Traversing," Journal of the Association for Computing Machinery, vol. 23, No. 3, Jul. 1976, pp. 544-554.
Raniwala, et al., "Deployment Issues in Enterprise Wireless LANs," RPE Report, Sep. 2003, 36 pages.
Robinson et al., "Received Signal Strength Based Location Estimation of a Wireless LAN Client," 2005 IEEE Wireless Communications and Networking Conference, vol. 4, Mar. 13-17, 2005, New Orleans, LA, 6 pages.
Saha et al., "Location Determination of a Mobile Device Using IEEE 802.11b Access Point Signals," 2003 IEEE Wireless Communications and Networking, Mar. 16-20, 2003, New Orleans, Louisiana, Conference Record, 7 pages.
Schilit et al., "Challenge: Ubiquitous Location-Aware Computing and the "Place Lab" Initiative," WMASH '03 Proceedings of the 1st ACM International Workshop on Wireless Mobile Applications and Services on WLAN Hotspots, Sep. 2003, pp. 29-35.
Schilit, et al., "Bootstrapping the Location-enhanced World Wide Web," Workshop on Location-Aware Computing (at UbiComp 2003), Seattle, WA, Oct. 2003, 4 pages.
Schmandt et al., "The New Urban Infrastructure, Cities and Telecommunications," Praeger Publishers, 1990, ISBN: 0-274-93591-4, 28 pages.
Shih, "Wireless LAN Location System," A Thesis Submitted for the Degree of Master of Engineering, Nov. 2003, School of Information Technology and Electrical Engineering, The University of Queensland, 98 pages.
Shipley, "802.11b War Driving and LAN Jacking," DEFCON 9 Conference, Las Vegas, Nevada, USA, Jul. 13-15, 2001, available at http://www.defcon.org/html/links/dc-archives/dc-9-archive.html, last accessed Apr. 13, 2011, video and transcript, 49 pages.
Shipley, "Open WLANs the early results of war Driving," DEFCON9 Conference 802.11b War Driving Presentation, 39 pages, 2001.
Small et al., "Determining User Location for Context Aware Computing Through the Use of a Wireless LAN Infrastructure," Dec. 2000, retrieved from http://www.ices.cmu.edu/reports/040201/pdf. 8 pages.
Spielman et al., Java and GIS, Part 1: Intro to GIS, Feb. 2004, available at http://today.java.net/pub/a/today/2004/02/16/gis.html, last accessed Apr. 14, 2011, 4 pages.
Spielman et al., Java and GIS, Part 2: Mobile LBS, Apr. 2004, available at http://today.java.net/pub/a/today/2004/04/01/gis.html, last accessed Apr. 14, 2011, 6 pages.
Texas Advisory Commission on Intergovernmental Relations, "Implementing 9-1-1 Systems in Texas: Legal and Institutional Background," Jun. 1987, 61 pages.
Sterling, et al., The Iridium System—A Revoluntionary Satellite Communications System Developed with Innovative Applications of Technology, IEEE Communications Society, 1991, Milicom '91, pp. 0436-0440.
Stone, "Kismet & GPSdrive: Wireless Network Sniffling with Open Software," UKUUG Leeds, 2004, 32 pages.
Taheri et al., "Location Fingerprinting on Infrastructure 802.11 Wireless Local Area Networks," Proceedings of the 29th Annual IEEE International Conference on Local Computer Networks (LCN'04), Nov. 16-18, 2004, Tampa, Florida, 9 pages.
Terminal Equipment and Protocols for Telematic Services, CCITT, The International Telegraph and Telephone Consultative Committee, International Telecommunication Union, Sep. 1992, 186 pages.

(56) References Cited

OTHER PUBLICATIONS

Torrone, "How-To Tuesday: War Kayaking," Nov. 2012, 5 pages, available at www.engadget.com/2004/06/22-how-to-Tuesday-war-kayaking.

Wallace, "Domino's Delivers Using New Call Routing Service," Network World, vol. 8, No. 32, Aug. 1991, 2 pages.

Wang et al., "Two New Algorithms for Indoor Wireless Positioning System (WPS)," Proceedings of the 17th International Technical Meeting of the Satellite Division of The Institute of Navigation, 2004, 8 pages.

Welch, et al., "A Survey of 802.11a Wireless Security Threats and Security Mechanisms," A Technical Report to the Army G6, 20 pages, retrieved from www.itsec.gov.cn/docs/20090507161931121853.pdf. Date not available.

Wikipedia, "Delta Encoding," Accessed at http://cn.wikipedia.org/wiki/Dalta_encoding on Dec. 29, 2010. 5 pages.

International Search Report and Written Opinion of the International Searching Authority, The United States Patent and Trademark Office, for International Application No. PCT/US2011/059139, dated Jan. 31, 2012, 12 pages.

\* cited by examiner

ACCURACY AND PERFORMANCE OF A HYBRID POSITIONING SYSTEM

CROSS-REFERENCE TO RELATED APPLICATIONS

This application is related to the following references:

U.S. patent application Ser. No. 12/479,721, filed Jun. 5, 2009 and entitled "Systems and methods for Using Environmental Information in a Hybrid Positioning System;"

U.S. patent application Ser. No. 12/479,722, filed Jun. 5, 2009 and entitled "Systems and Methods for Maintaining Clock Bias Accuracy in a Hybrid Positioning System;"

U.S. patent application Ser. No. 12/479,723, filed Jun. 5, 2009 and entitled "System and Method for Refining a WLAN-PS Estimated Location Using Satellite Measurements in a Hybrid Positioning System;"

U.S. patent application Ser. No. 12/479,724, filed Jun. 5, 2009 and entitled "Systems and Methods for Determining Position Using a WLAN-PS Estimated Position as an Initial Position in a Hybrid Positioning System;"

U.S. patent application Ser. No. 12/479,727, filed Jun. 5, 2009 and entitled "Methods and Systems for Improving the Accuracy of Expected Error Estimation in a Hybrid Positioning System;"

U.S. patent application Ser. No. 12/479,729, filed Jun. 5, 2009 and entitled "Methods and Systems for Stationary User Detection in a Hybrid Positioning System;"

U.S. patent application Ser. No. 12/479,734, filed Jun. 5, 2009 and entitled "System and Method for Using a Satellite Positioning System to Filter WLAN Access Points in a Hybrid Positioning System;"

U.S. patent application Ser. No. 12/479,718, filed Jun. 5, 2009 and entitled "Method and System for Determining Location Using a Hybrid Satellite and WLAN Positioning System by Selecting the Best WLAN-PS Solution;"

U.S. patent application Ser. No. 12/485,588, filed Jun. 16, 2009 and entitled "Methods and Systems for Determining Location Using a Cellular and WLAN Positioning System by Selecting the Best WLAN PS Solution;"

U.S. patent application Ser. No. 12/485,591, filed Jun. 16, 2009 and entitled "Methods and Systems for Determining Location Using a Cellular and WLAN Positioning System by Selecting the Best Cellular Positioning System Solution;"

U.S. patent application Ser. No. 12/485,595, filed Jun. 16, 2009 and entitled "Methods and Systems for Improving the Accuracy of Expected Error Estimation in Location Determinations Using a Hybrid Cellular and WLAN Positioning System;"

U.S. patent application Ser. No. 12/504,373, filed Jul. 16, 2009 and entitled "Systems and Methods for Using a Satellite Positioning System to Detect Moved WLAN Access Points;" and U.S. patent application Ser. No. 12/504,379, filed Jul. 16, 2009 and entitled "Methods and Systems for Determining Location Using a Hybrid Satellite and WLAN Positioning System by Selecting the Best SPS Measurements."

BACKGROUND

1. Field

The present disclosure generally relates to hybrid positioning and more specifically, describes a new method to assess the quality of a set of satellite positioning system (SPS) measurements to be used for hybrid positioning. In order to do so, the disclosure proposes to use variations of clock bias at the receiver side to assess the quality of current set of satellites and their respective range measurements.

2. Description of the Related Art

Positioning using radio signals has attracted increasing attention in the field of location and tracking. The initial research studies on SPS resulted in a Global Positioning System (GPS) which was initially used for military applications and later broadly used for commercial and personal applications as well. The availability of SPS-based positioning has been a major factor in the introduction of Location Based Services (LBS) in advanced mobile communication devices such as smartphones. By determining the position of the receiver, the system is able to provide more effective and more appropriate services to the user.

The Navstar Global Positioning System (GPS) operated by the US Government leverages about two-dozen orbiting satellites in medium-earth orbits as reference points. A user equipped with a GPS receiver can estimate his three-dimensional position (latitude, longitude, and altitude) anywhere at any time within several meters of the true location as long as the receiver can see enough of the sky to have four or more satellites "in view." Cellular carriers can use signals originating from and received at cell towers to determine a user's or a mobile device's location. Assisted GPS (AGPS) is another model that combines both GPS and cellular tower techniques to estimate the locations of mobile users who may be indoors and must cope with attenuation of GPS signals on account of sky blockage. In this model, the cellular network attempts to help a GPS receiver improve its signal reception by transmitting information about the satellite positions, their clock offsets, a precise estimate of the current time, and a rough location of the user based on the location of cell towers. No distinction is made in what follows between GPS and AGPS.

All positioning systems using satellites as reference points are referred to herein as Satellite-based Positioning System (SPS). While GPS is the only operational SPS at this writing, other systems are under development or in planning A Russian system called GLONASS and a European system called Galileo may become operational in the next few years. All such systems are referred to herein as SPS. GPS, GLONASS and Galileo are all based on the same basic idea of trilateration, i.e., estimating a position on the basis of measurements of ranges to the satellites whose positions are known. In each case, the satellites transmit the values of certain parameters which allow the receiver to compute the satellite position at a specific instant. The ranges to satellites from a receiver are measured in terms of the transit times of the signals. These range measurements can contain a common bias due to the lack of synchronization between the satellite and receiver (user device) clocks, and are referred to as pseudoranges. The lack of synchronization between the satellite clock and the receiver (user device) clock can result in a difference between the receiver clock and the satellite clock, which is referred to as internal SPS receiver clock bias or receiver clock bias. In order to estimate a three dimensional position there is a need for four satellites to estimate receiver clock bias along with three dimensional measurements. Additional measurements from each satellite correspond to pseudorange rates in the form of Doppler frequency. References below to raw SPS measurements are intended generally to mean pseudoranges and Doppler frequency measurements. References to SPS data are intended generally to mean data broadcast by the satellites. References to an SPS equation are intended to mean a mathematical equation relating the measurements and data from a satellite to the position and velocity of an SPS receiver.

WLAN-based positioning is a technology which uses WLAN access points to determine the location of mobile users. Metro-wide WLAN-based positioning systems have been explored by several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. There is only one commercial metropolitan WLAN-based positioning system in the market at the time of this writing, and it is referred to herein as the WPS (WiFi positioning system) product of Skyhook Wireless, Inc (www.skyhookwireless.com).

SPS is based on triangulation (trilateration) using multiple distance measurements from multiple satellites. The receiver measures its distance from at least four satellites. Based on the distance measurements, the receiver solves a set of quadratic equations including, coordinates of the receiver, and, receiver clock bias. In order to quantify the accuracy of the location estimate (quality of estimate of the reported location,) SPS systems use several metrics such as Dilution of Precision ($DOP_0$). (Indices, like index 0, are used to differentiate different DOP definitions here). Widely used in literature, the geometry of the set of visible satellites, indicated by $DOP_0$ metric, is assumed to have correlation with estimated location error. In other words, $DOP_0$ relates the geometry of the satellites to the quality of the location estimate.

In hybrid positioning, the IEL of the receiver is estimated by using a method other than SPS (such as Wireless Local Area Network-based Positioning System or WLAN-PS). The results are then refined once SPS signals are acquired. In current hybrid positioning systems, a 3-D region is constructed centered on the IEL. The size of this 3-D region is related to the accuracy of the estimated location (IEL). Then the positioning system searches through all the possible locations inside the region and selects the location with minimum SPS receiver clock bias variations (Hybrid positioning systems are disclosed in the following commonly used application, the entire contents of which are hereby incorporated by reference: U.S. patent application Ser. No. 12/479,718, filed Jun. 5, 2009 and entitled "Method and System for Determining Location using a Hybrid Satellite and WLAN Positioning System by Selecting the Best WLAN-PS Solution;" U.S. patent application Ser. No. 12/485,588, filed Jun. 16, 2009 and entitled "Method and Systems for Determining Location Using a Cellular and WLAN Positioning System by Selecting the Best WLAN PS Solution;" U.S. patent application Ser. No. 12/485,591, filed Jun. 16, 2009 and entitled "Methods and Systems for Determining Location Using a Cellular and WLAN Positioning System by Selecting the Best Cellular Positioning System Solution;" and U.S. patent application Ser. No. 12/485,595, filed Jun. 16, 2009 and entitled "Methods and Systems for Improving the Accuracy of Expected Error Estimation in Location Determinations Using a Hybrid Cellular and WLAN Positioning System."). The concept is summarized in FIG. 1, as described below. In current hybrid positioning systems, all visible satellites are used to refine IEL. However, some satellites experience multipath and their range estimates are too inaccurate for use in hybrid positioning. Therefore, there is a need for methods to assess the quality of set of current measurements and detect satellites with erroneous range estimates so the system can remove them from location estimation.

It is also possible for the hybrid positioning system to receive a set of SPS signals which are pointing the system very far from the location obtained in the initial estimate. In such cases, SPS measurements might be consistently close to one another, but the overall SPS result might be very different from initial location. In such cases, there is a need to detect the discrepancies between the IEL and the SPS-refined location estimate.

The current hybrid positioning systems use the location with absolute minimum SPS receiver clock bias variation and neglects all the other locations in the region with similar SPS receiver clock bias characteristics. An optimal result can be achieved if one combines results of all the locations with similar SPS receiver clock biases. In such cases, there is a need for an algorithm to combine such locations and obtain a final location.

The conventional methods perform the task of searching through all three dimensions of the region's grid-locations one by one (referred to as 3D-search) and computing the SPS receiver clock bias for each location and then selecting the point with minimum SPS receiver clock bias variation, as illustrated in FIG. 1. In such cases, there is a need for an algorithm to perform a faster search and obtain the final location faster.

SUMMARY

The following description describes a method in hybrid positioning systems to remove satellites with erroneous range estimates from the process of estimation of receiver location. The remaining satellites can then be used to estimate the location of the receiver by the hybrid positioning system which results in more accurate results. Once hybrid positioning system decides on using SPS measurements to refine the IEL, the disclosure describes a method to obtain a more accurate final location estimate using an aggregate of locations with sufficiently small SPS receiver clock bias variation. The following description also describes a method in hybrid positioning to assess the quality of current set of satellites and remove a set of satellites with erroneous range estimate from the process of location estimation. The outcome of the process will determine if the IEL should be used for positioning the receiver location or SPS reported location. The following disclosure also describes a method in hybrid positioning to obtain a faster and relatively more accurate final estimate of the receiver location using two-dimensional searches (referred to as 2D-searches) in each XY, XZ, and YZ planes and combining the results of each of 2D-searches to find the final estimate of the receiver location. The present disclosure also relates to hybrid positioning and more specifically, describes a new method to refine the initial estimated location (IEL) and obtain an improved estimate of the receiver location. In order to so, the method includes a proposal for the removal of satellites with erroneous range estimates from the current set of visible satellites.

In one aspect, the present disclosure relates to a method of determining the position of a WLAN positioning system (WPS) and satellite positioning system (SPS) enabled device including determining an initial WPS position of the device using WPS, calculating an error region around the initial WPS position of the device, dividing the error region into a plurality of points, obtaining satellite measurements from at least two satellites in view of the device, determining a variation in a receiver clock bias for each point within the error region based on the satellite measurements from at least two satellites, selecting the point with the lowest variation in the receiver clock bias, and determining whether or not to use the point with the lowest variation in receiver clock bias to refine the initial WPS position of the device.

In one embodiment, determining whether or not to use the point with the lowest variation in receiver clock bias to refine the initial WPS position of the device includes rejecting the point with the lowest receiver clock bias variation if the point is located on an edge of the error region. In some embodiments, determining whether or not to use the point with the lowest variation in receiver clock bias to refine the initial WPS position of the device includes rejecting the satellite measurements if the region displays monotonicity. In some embodiments, determining whether or not to use the point with the lowest variation in receiver clock bias to refine the initial WPS position of the device includes rejecting a point having a large variation in receiver clock bias. In some embodiments, a large variation in receiver clock bias can include 20 and greater.

In one embodiment, the method includes evaluating the accuracy of individual satellite measurements in order to lower the variation in the receiver clock bias for a set of satellites, and wherein the number of satellites is greater than two. In one embodiment, evaluating the accuracy of individual satellite measurements includes: grouping the satellites into sub-groups of two or more satellites, determining a variation in receiver clock bias for each of the sub-groups, comparing the variation of receiver clock bias in the sub-groups to select a sub-group with a minimum SPS receiver clock bias variation, and determining an individual satellite measurement with an inaccurate receiver clock bias estimate as the satellite which was excluded from the sub-group selected in the previous step. In one embodiment, the method includes determining a minimum value of the receiver clock bias, determining a maximum value of the receiver clock bias, determining a median value of the receiver clock bias, comparing the difference between the minimum value and median and maximum value and median and selecting the larger of these two differences, and determining an individual satellite measurement with an inaccurate receiver clock bias estimate as the satellite which corresponded to the larger selected value in the previous step.

In one embodiment, the method includes discarding satellite measurements from satellites that have inaccurate receiver clock bias estimates. In one embodiment, determining whether or not to use the point with the lowest variation in receiver clock bias as a refined estimate of the initial WPS position of the device includes accepting a point having a small receiver clock bias. In one embodiment, a small variation comprises a value between 0 and 5. In one embodiment, the method includes determining that the WPS position is a final location of the device if no minimum of receiver clock bias variation exists in the error region. In one embodiment, the method includes determining that the WPS position is a final location of the device if value of SPS receiver clock bias was large. In one embodiment, the satellite measurements are obtained from at least three satellites. In one embodiment, the satellite measurements are obtained from more than three satellites.

In another aspect, the present disclosure also relates to a method for determining the position of a WLAN positioning system (WPS) and satellite positioning system (SPS) enabled device including determining an initial WPS position of the device using WPS, calculating an error region around the initial WPS position of the device, dividing the error region into a plurality of points, obtaining satellite measurements from at least two satellites in view of the device, determining a variation of a SPS receiver clock bias for each point within the error region based on the satellite measurements from at least two satellites, selecting a group of points with the lowest variation in the receiver clock bias, and determining a new refined position based on the group of points, wherein the refined location is computed as an average of all the group of points wherein the refined location is computed as a weighted average of all the aggregate points.

In one aspect, the present disclosure also relates a method for to determining the position of a WLAN positioning system (WPS) and satellite positioning system (SPS) enabled device including determining an initial WPS position of the device using WPS, calculating an error region around the initial WPS position of the device, dividing the error region into three planes including an x-y plane, a x-z plane, and a y-z plane, determining a point in each plane with the lowest value of receiver clock bias, and determining a final location of the device by averaging the points in each plane with the lowest value of receiver clock bias.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION

Figure 1:
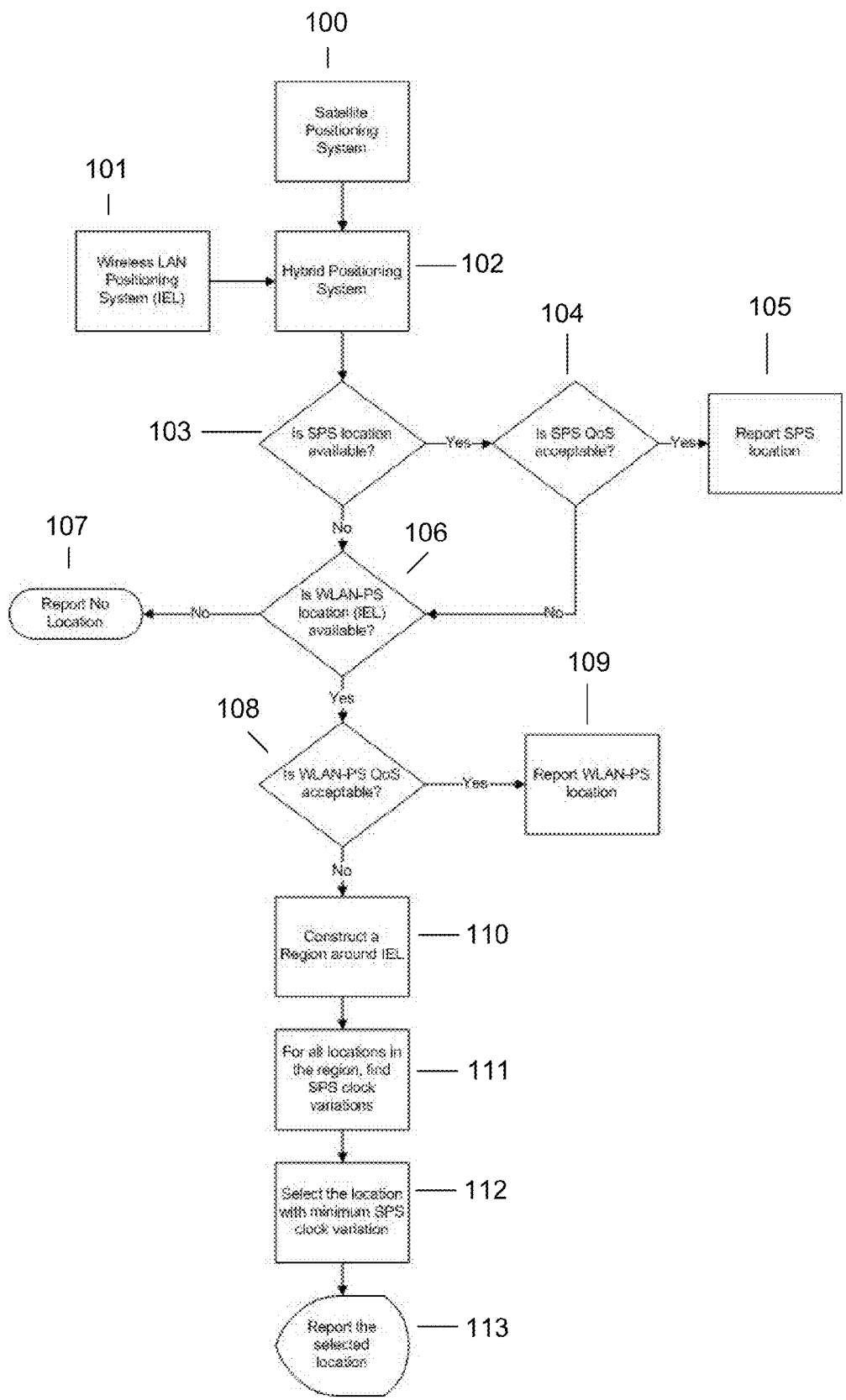
FIG. 1 is a flow chart describing the basic operation of a hybrid positioning system, according to one embodiment of the present disclosure.

The following disclosure relates to systems and methods for evaluating the quality of either a set of satellites or individual satellites in a hybrid positioning system. The quality of the set satellites is evaluated using receiver clock bias. In that capacity, a high quality set of satellites is the one that satellites show consistency in predicting receiver clock bias. For that matter, all the estimations of receiver clock bias from different satellites should be close to one another. On the other hand, a bad quality set of satellites is the one that shows large variations when receiver clock bias is estimated for all satellites. In order to determine receiver clock bias for each satellite, the WLAN positioning system, in the hybrid system, provides an IEL and a region of error around that IEL. The shape and size of the region of error is based on IEL and its accuracy and hence this region relates to the quality of the IEL measurement (QoS). The IEL and the region of error create what will be referred to as the region. The region provides a set of locations where the receiver can be located, i.e., the receiver could be located at any point within the region. In the following paragraphs, the word variation is used to illustrate any measure of disparity between the taken measurements or elements of a vector. As an example of this disparity we have used variance in some of our calculations. Other means of variation such as range between the values can also be used in this approach.

By using each point in the region as an initial location, the receiver clock bias for each satellite at each location can be determined. This results in an array of values for estimates of receiver clock bias for each location inside the region. From these determinations, the variance of the receiver clock bias for each location inside the region can be calculated. This variation in the receiver clock bias can be used to eliminate low quality satellite measurements. For a high quality set of satellites this variation is small and for a low quality set of satellite this variation is large. In principle, if a satellite or several satellites are providing erroneous information, the estimate of the receiver clock bias for those satellites is very different from the other satellites and hence we see large variations when we examine the array of receiver clock bias estimates.

In another embodiment, the variation in the receiver clock bias among all visible satellites for each location can be calculated. The locations with the smallest variation in receiver clock bias can be selected. Those selected locations are then averaged to determine a final location of the receiver.

In another embodiment, the searching of the region for the points with the lowest variation in receiver clock bias is simplified by using a two dimensional method instead of a three dimensional method.

Generally, in such hybrid positioning systems, the final reported location can be one of the following;
1) IEL along with its quality estimate ("QoS");
2) SPS reported location when four or more satellites are visible along with its quality estimate; or
3) A combination of IEL and SPS reported locations.

In the process of location determination using SPS only, the receiver receives raw SPS range measurements and satellite information from satellites in the view of the receiver. Using the range measurements and satellite information of four or more satellites, the receiver solves a set of quadratic equations for the location and the SPS receiver clock bias. Because the same receiver receives all of the satellite information, the SPS receiver clock bias for all the satellites should be the same.

If the SPS location could not be determined or its expected error exceeded its threshold, i.e. poor QoS, the positioning system will look into IEL (reported by a method other than SPS, for example, WPS). If the IEL had sufficiently small expected error, i.e. acceptable QoS, the hybrid positioning system reports IEL as the final location. Otherwise, the system uses the SPS signals to refine the IEL. In the refinement process, the positioning system constructs a 3D region around IEL and searches all the locations in that region for a location with minimum SPS receiver clock bias variation. This location with minimum SPS receiver clock bias variation is the best estimate of the true location inside the region. This process is illustrated in FIG. 1. In FIG. 1, satellite positioning system (SPS) 100 provides satellite information to hybrid positioning system 102. Wireless LAN positioning system (WLAN-PS) 101 provides an IEL. The hybrid positioning system 102 collects the inputs from SPS and WLAN-PS and attempts to improve the precision of the IEL by providing a better estimated location with better accuracy. In 103, the hybrid positioning system checks if SPS has provided an estimated location. If a location was provided by SPS and its accuracy fulfills the requirements set in hybrid positioning system (in 104), the hybrid positioning system reports the SPS location in 105. If a location was not provided by SPS or if its accuracy was not met by the standards set by the hybrid positioning system, hybrid positioning system checks if there is an IEL 106. If no location was provided through IEL as well, the hybrid positioning system reports no location 107. If the IEL was provided, the hybrid positioning system checks to see if the accuracy of the IEL is acceptable 108. If it was acceptable, system reports the IEL as its reported location 109. If the IEL accuracy is unacceptable, the system constructs a region around the IEL 110. For each location inside the constructed region, the hybrid positioning system then finds all the estimates of receiver clock bias and calculates the variance of this set 111. The system then selects the location with minimum variance as its best estimated location within the region 112 and reports it to the interface 113. In perfect scenarios, all the estimates of SPS clock bias are equal so their variance is zero. However, in realistic scenarios this variation is not zero, but it is preferred for the hybrid positioning system to have very small variations for the estimate of SPS receiver clock bias.

The embodiments of this disclosure propose to relate the variations of the SPS receiver clock bias to the quality of the current set of satellites. In order to do so, the disclosure proposes to analyze the SPS receiver clock bias variations for all the locations inside the region specified by IEL and its QoS. The definition of such region can simply start from a sphere with its center on IEL and radius equal (or directly proportional) to QoS and extend to a complex shape around IEL. For all the locations inside this specified region, the hybrid positioning system calculates the variation of the SPS receiver clock bias and selects the location with minimum variation of the SPS receiver clock bias. Based on the value of the location and its position relative to the region, the hybrid positioning system can assess the quality of the current set of satellites to be used in hybrid positioning.

The process of calculating the variation of SPS receiver clock bias starts with estimating the receiver clock bias corresponding to each satellite in the set. Ideally, all the receiver clock biases should be equal. However, in practice, the estimates of receiver clock bias can be different. Then the variation of the estimates can be used to illustrate how far the receiver clock bias estimates are apart. In the case of a large variation of the SPS receiver clock bias, the hybrid positioning system detects discrepancies between the IEL and SPS signals and can reject the use of SPS signals in the hybrid positioning. Alternatively, the relative position of the grid-location with minimum variation inside the region can be used to assess the quality of the SPS signals. If the location with the minimum variation is on the boundary of the defined region, the positioning system can reject the use of SPS signals in hybrid positioning.

As an example, in a hybrid positioning system consisting of an SPS and a WLAN-PS, the WLAN-PS reports an IEL with its expected error, QoS. The hybrid positioning system then has to check if an SPS location is reported. If the SPS location is provided and the SPS expected error is sufficiently small, i.e. an acceptable QoS—for example values of error less than 50 meters, the hybrid positioning system reports the SPS location. If the SPS location is not provided or its expected error exceeds the threshold, i.e. poor QoS, the hybrid positioning system checks the IEL reported by WLAN-PS and its expected error. If the IEL's expected error is sufficiently small, i.e. acceptable QoS—for example values less than 100 meters, the hybrid positioning system reports IEL as the final location. Otherwise, the positioning system uses SPS satellite information and range measurements to refine the IEL and improve the accuracy of the location estimation (in terms of QoS).

Figure 2:
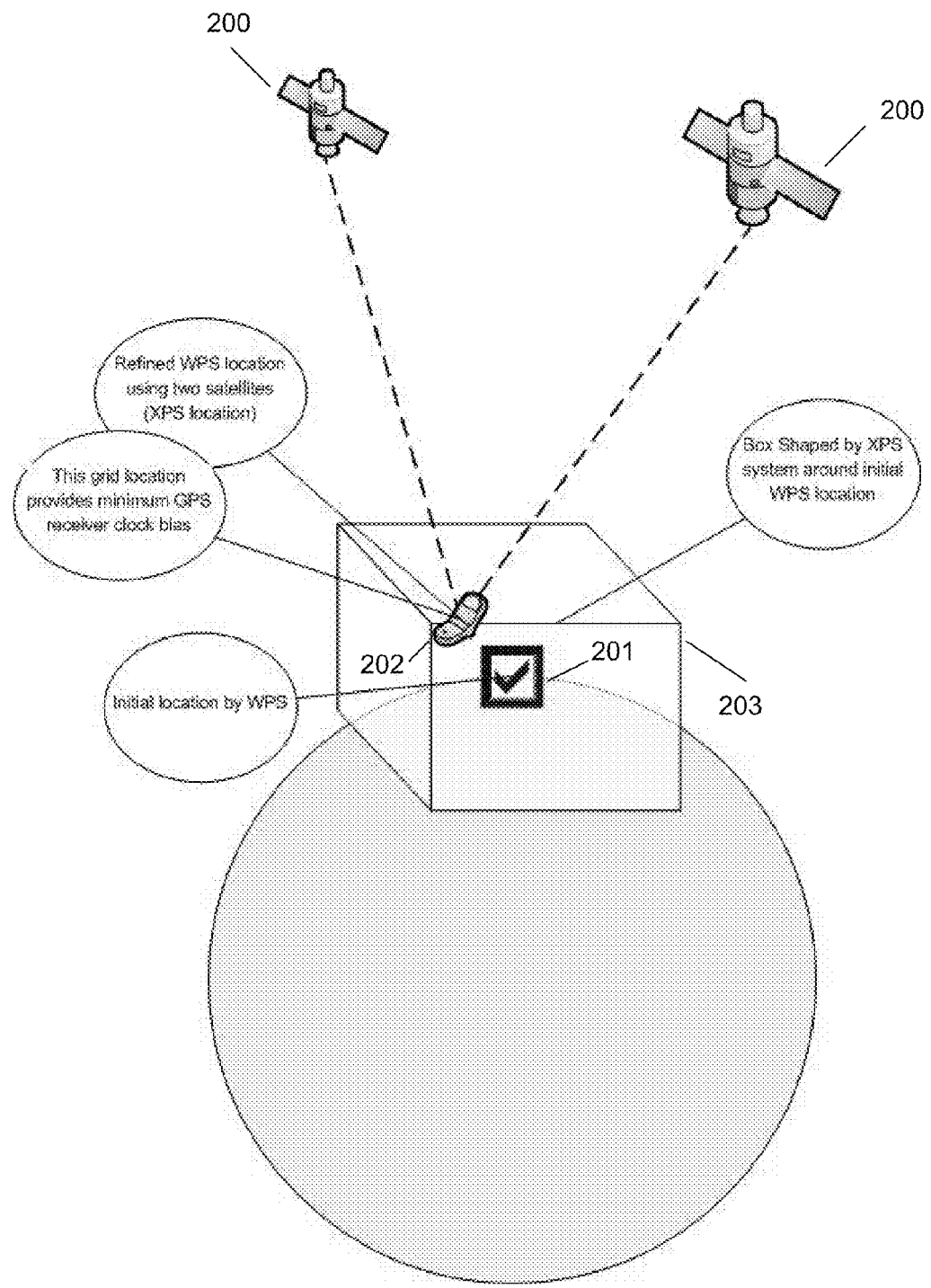
FIG. 2 represents a simple scenario where hybrid positioning system can use SPS signals to improve the accuracy of the IEL. IEL is provided by WLAN-based positioning system and satellite signals from two satellites are used to refine IEL.

In order to assess the quality of current set of satellites in such hybrid positioning systems, the hybrid positioning system constructs a region centered on IEL. The region spans over x, y, and z axes. FIG. 2 represents such scenario. Satellites 200 provide satellite information which can be used in hybrid positioning system to refine the IEL 201. The IEL is provided by WLAN-PS and it is used to construct region 203 around it by hybrid positioning system. The refined location 202 is calculated after the hybrid positioning system uses the satellite information to improve the accuracy of the IEL. The hybrid positioning system then evaluates the variations of SPS receiver clock bias for all the locations inside the region. For each location inside the region, the hybrid positioning system finds all the estimates of the SPS receiver clock bias from all the satellites and catalogs them in an array. The system then finds the variation of the set by comparing the estimates to check how close or how far the SPS receiver clock bias estimates are. The system then selects the location with the minimum SPS receiver clock bias variation. Based on the value and location of the minimum SPS receiver clock bias variation, the hybrid positioning system decides if it should use the SPS information and range measurements to refine the IEL and report the location with minimum SPS receiver clock bias variation. Values between 0 and 5 can be considered as good, while values more than 20 should be rejected. In the case of a large variance of SPS receiver clock bias and/or large distance between the location with minimum variation and the IEL, the hybrid positioning system detects discrepancies between the IEL and the SPS signals and hence rejects the use of SPS signals in hybrid positioning.

For the example of the hybrid positioning system including a WLAN-PS and a SPS, the hybrid positioning system can construct a region centered on IEL (reported by WLAN-PS) using grid locations on different axes. Then for each location inside the region (which are referred to as grid locations), the hybrid positioning system can evaluate the variation of SPS receiver clock bias using $$\bar{\tau}_{rms} = \frac{1}{N}\sqrt{\sum_{i=1}^{N}(\tau_i - \bar{\tau})^2} \text{ where } \bar{\tau} = \frac{1}{N}\sum_{i=1}^{N}\tau_1$$

is the unbiased sample mean of SPS receiver clock bias and $\tau_i$ is the estimate of SPS receiver clock bias from the i th satellite. For example, if for a specific location with four satellites in view the system found SPS receiver clock biases from different satellites to be [10000 10010 10500 9500], the system first finds the average of the set which is 10002.5. Then each element is subtracted from the average and squared which results in [6.25 56.25 247506.25 252506.25]. Then the system sums all the resulted values to get 500075 and the final value for variation is the square root of 500075 divided by number of satellites which gives us. 176.78. This value is high. Therefore, these satellites would not be used for positioning.

Figure 3:
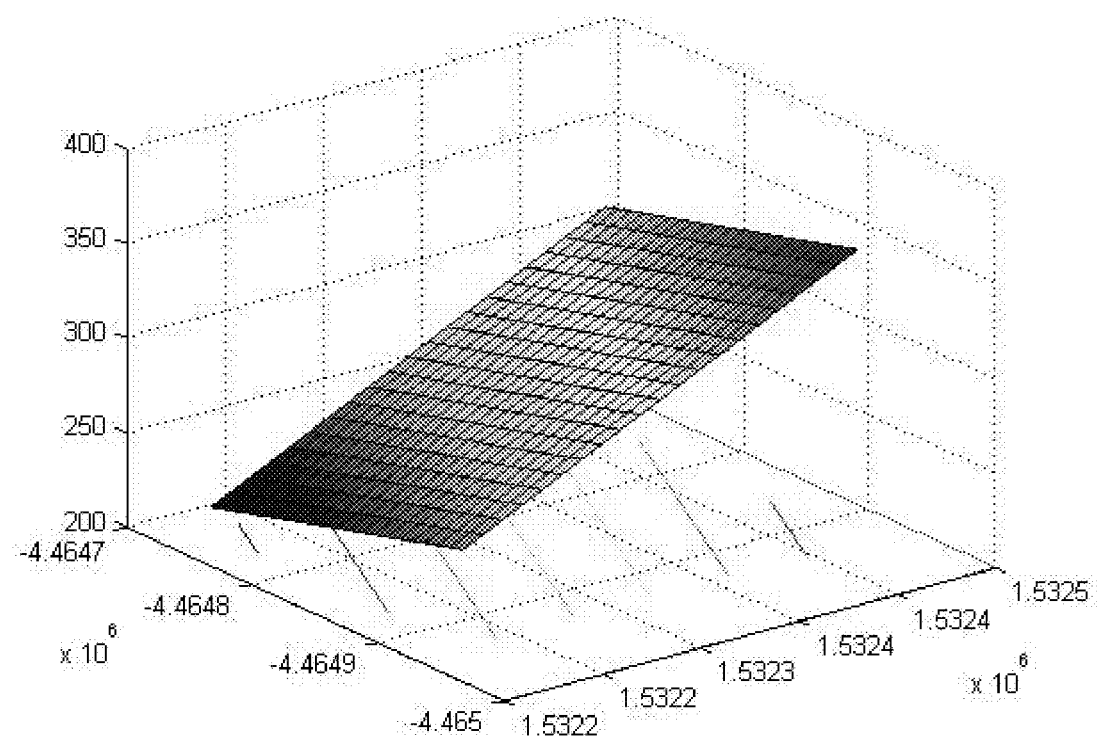
FIG. 3 is a graphical representation of a single surface demonstrating a single z-plane for cases of bad satellite information, according to one embodiment of the present disclosure.

FIG. 3 illustrates such variations for an assessment of the quality of SPS measurements. The Figure represents the values of SPS receiver clock bias for different values of x-axis and y-axis coordinates for a fixed z-value (different from figure's z-axis which shows the value of SPS receiver clock bias).

The large values of the z-axis (which show variations of SPS receiver clock bias) and its monotonic shape for the entire plane prove that for this case the SPS receiver clock bias variation was large and SPS measurements were not in agreement with the IEL.

Figure 4:
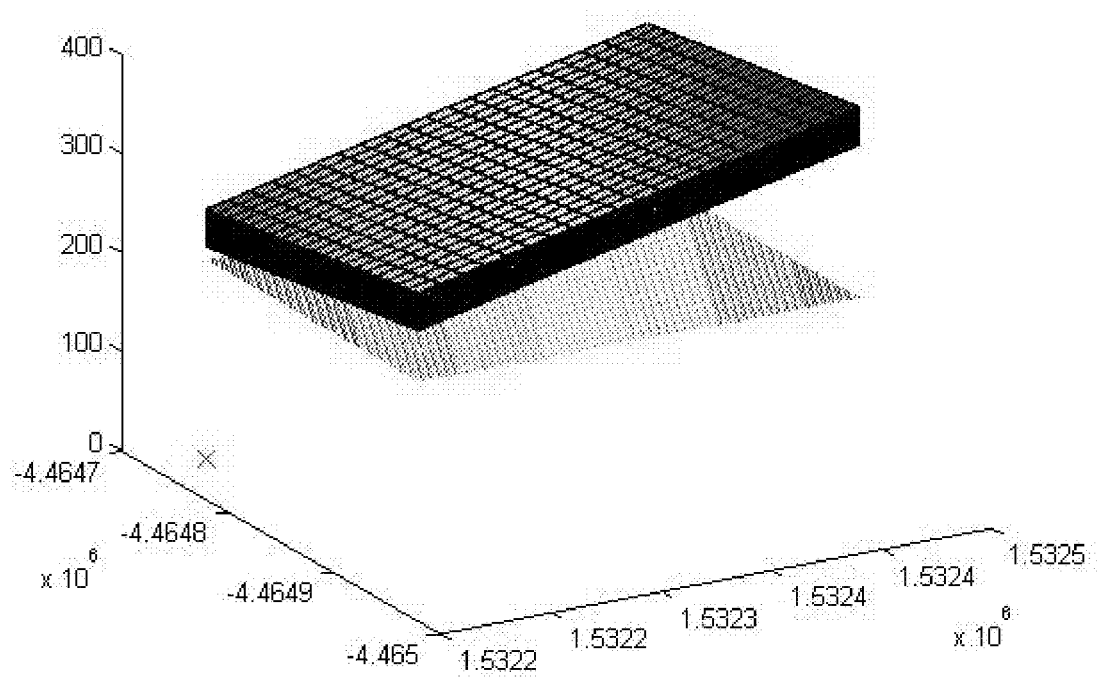
FIG. 4 is a graphical representation of multiple surfaces demonstrating the entire region and their respective SPS receiver clock bias for cases of bad satellite geometry, according to one embodiment of the present disclosure.

For the purpose of illustration, we divided the region into different z-planes and sketched the various values of SPS receiver clock bias versus x and y axes. For all the z-planes, and consequently the entire region, we can sketch all the surfaces on top of each other, which will look like FIG. 4. Again, it can be seen that for all z-planes, the shape of the SPS receiver clock bias variation is monotonic as it does not have any minimums on its local surface and values of SPS receiver clock bias variation are large. Therefore, it can be concluded that a local minimum for SPS receiver clock bias variation could not be obtained and hence, the current set of SPS measurements are not in agreement with the IEL.

It is worth mentioning that monotonicity of the clock variation cannot be observed by simply looking at the minimum value of SPS receiver clock bias. Hence, the above-mentioned analysis allows the hybrid positioning system to determine if monotonicity of clock variation exists and hence rejects the current set of satellites.

Figure 5:
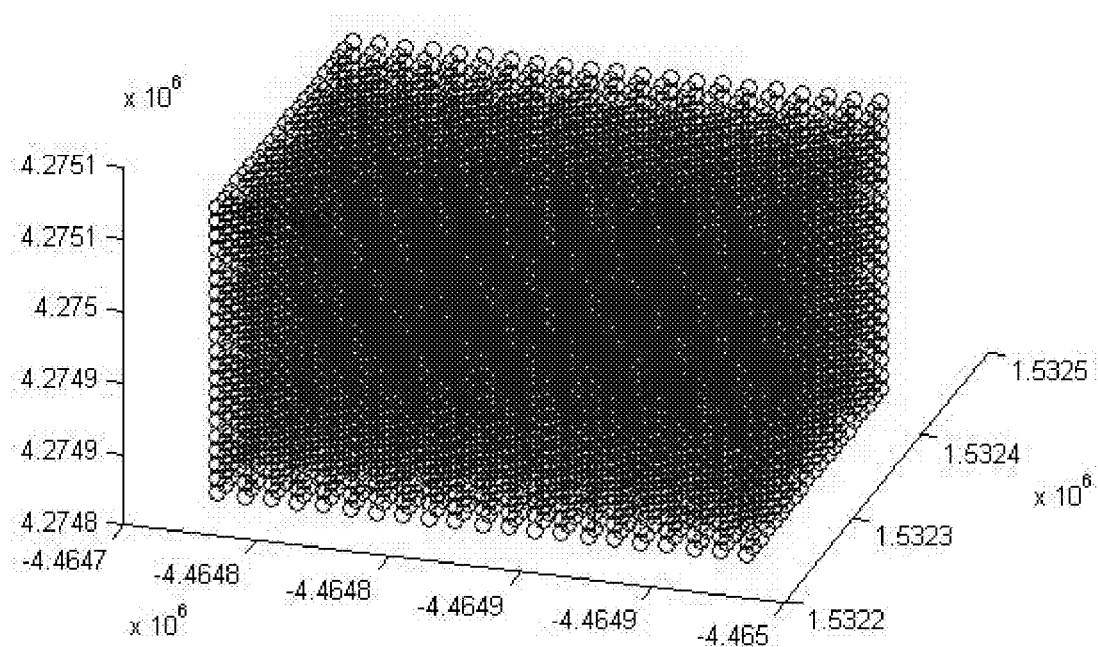
FIG. 5 is a color-coded graphical representation of a region to indicate the location of the location with minimum SPS receiver clock bias for cases with bad satellite geometry, according to one embodiment of the present disclosure.

In order to automate the process for mobile computing devices, we propose the following approach to detect the monotonicity by analyzing the variations of SPS receiver clock bias. Similar to the above methods, we form a region around the IEL and for each location we find the SPS receiver clock bias variance as described above. Then we find the minimum of all the locations' variations and choose the one with the absolute minimum value. If the minimum falls on the edges of the region, as indicated by FIG. 5, this will lead us to the fact that SPS receiver clock bias variation was a monotonic function and could not converge to a point inside the region. It should be noted that figures such as FIG. 5 are color coded to show the value of SPS receiver clock bias. Darker colors illustrate smaller variances for SPS receiver clock bias and consequently better estimates of the receiver location. In this case, the darkest location fell on the edge of the region and hence was rejected.

Through this method, low quality SPS measurements can be rejected. By detecting if the minimum point is on the edge, we can then declare that the received set of SPS measurements are of poor quality and their range measurements are erroneous; hence they cannot be used for hybrid positioning. For minimums that are located on the edge of the region, their value as a true minimum are untrustworthy. This is because only the interior of the region is searched. If the true minimum location was located two kilometers away from the region the location on the edge will be reported to be the minimum. For this reason we have to exclude all the locations that are on the edge.

Figure 6:
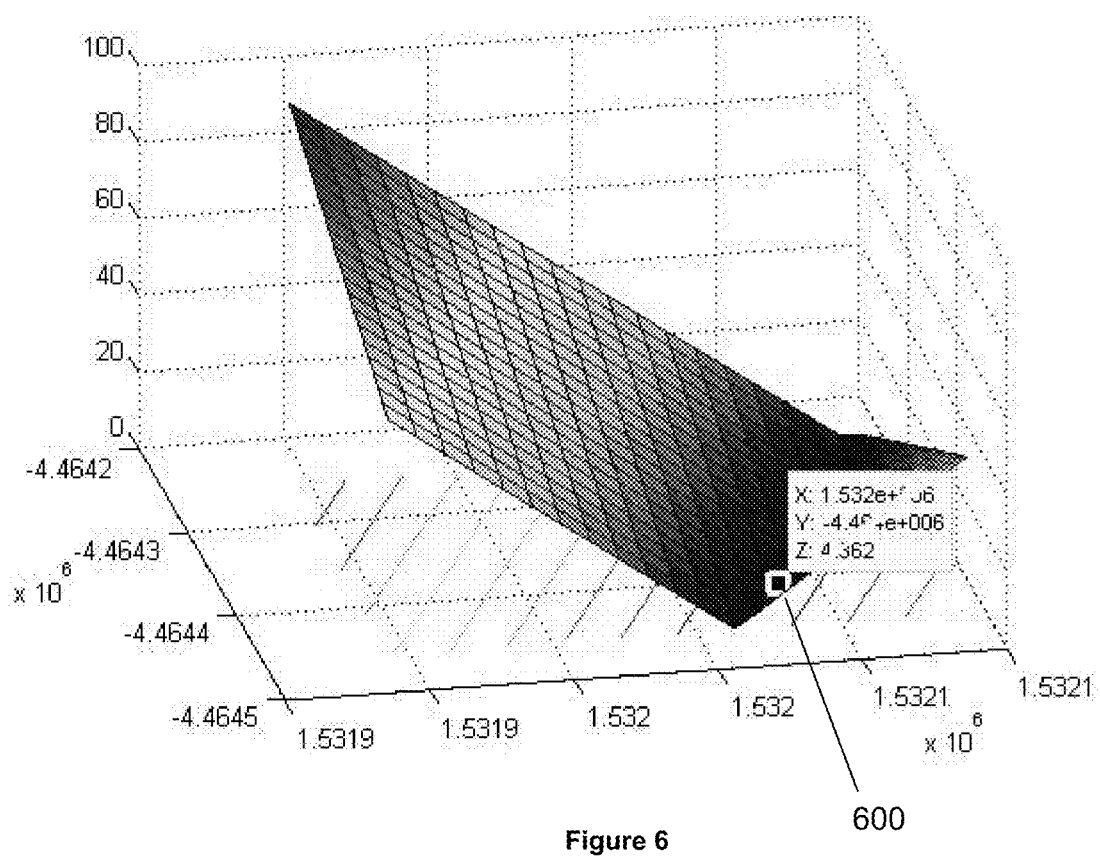
FIG. 6 is a graphical representation of a single surface demonstrating a single z-plane for cases of good satellite information, according to one embodiment of the present disclosure.
Figure 7:
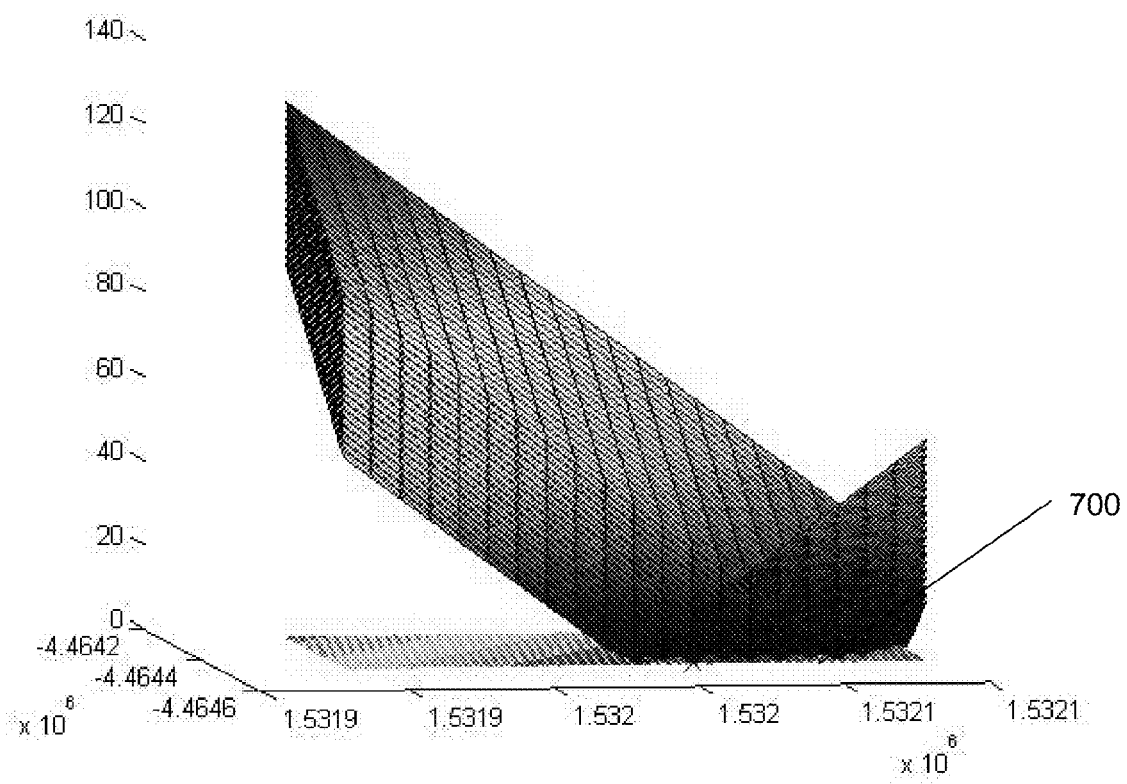
FIG. 7 is a graphical representation of multiple surfaces demonstrating the entire region and their respective SPS receiver clock bias for cases of good satellite geometry, according to one embodiment of the present disclosure.
Figure 8:
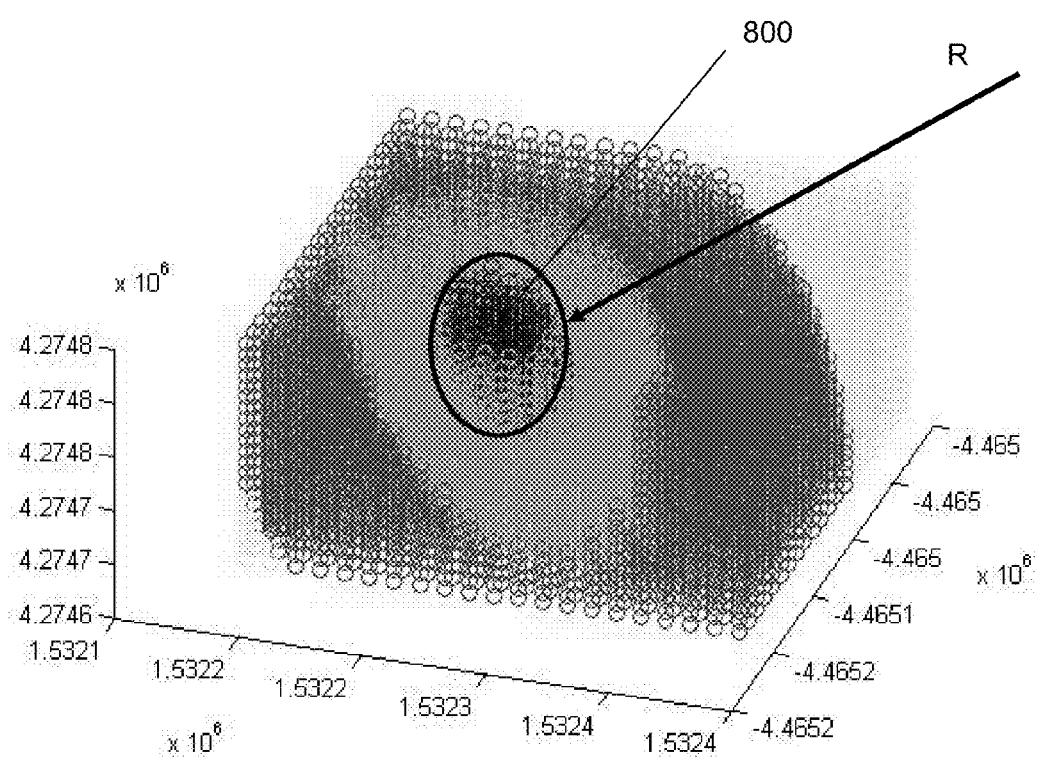
FIG. 8 is color-coded region to indicate the position of the location with minimum SPS receiver clock bias for cases with good satellite geometry, according to one embodiment of the present disclosure.

On the other hand, if the hybrid positioning system is able to find a location inside the region, the result will look similar to FIGS. 6-8. FIG. 6 illustrates variations of GPS receiver clock bias for an example of location with minimum variation. The Figure represents the values of SPS receiver clock bias for different values of x-axis and y-axis coordinates for a fixed z-value (different from figure's z-axis which shows the value of SPS receiver clock bias). The dark parts of the graph (which corresponds to the trough part of the graph) illustrate all the receiver location with close to minimum GPS receiver clock bias variation. It demonstrates that when the surface is not monotonic and has minimum values inside the box, those locations can be used for hybrid positioning. The same concept can be observed in FIG. 7 where several surfaces are illustrated together. The existence of the minimum 700 assures the system that system using SPS can find a better estimate of the location than just using the IEL alone. Hence it can provide a good estimate of the refined position of the end-user. In FIG. 8, it is possible to see that the darkest location 800 is inside the region. This darkest location is a minimum for the surface and the system from this minimum one can conclude that there exists at least one grid-location inside the region that can satisfy the variance requirement of the system.

Other embodiments of this disclosure describe a new technique in an integrated hybrid positioning environment, including an initial estimated location (IEL) along with its expected error, i.e. QoS, and SPS satellite information and range measurements, to remove a satellite from the current set of visible satellites to improve the accuracy of the location estimation. In order to do so, the invention relates the variations of SPS receiver clock bias estimate of the current set of satellites to the quality of estimated location.

As described above, in order to assess the quality of SPS measurements, the hybrid positioning system constructs a region centered on the IEL, calculates the variations of SPS receiver clock bias for all the locations inside the region, and selects the location with minimum variation.

The hybrid positioning system then compares this minimum variation of SPS receiver clock bias to its threshold. If sufficiently small, the current set of satellites can be used for positioning. The threshold value is a function of the QoS, i.e. expected error, of the SPS and IEL and level of desired accuracy. For more accurate applications, the system can set the threshold to smaller values. One example of the threshold values is 5 when the values are described in meters. Values between 0 and 5 are acceptable, while more than 20 should be rejected.

In the case of a large variance, we propose that the positioning system can check the subsets of the current visible satellites for the same defined region and remove the satellite which causes the large variation, i.e. the satellite with most inaccurate SPS receiver clock bias estimation. In order to do so, the positioning system forms different subset combinations. Similar to the general case, for each subset combination the positioning system finds the value of the minimum SPS receiver clock bias within the specified region.

The combination with smallest SPS receiver clock bias variation then can be chosen as our preferred set of satellites and the satellite which was excluded from that set can now be safely removed from the positioning algorithm. The resulting set of satellites then can be examined for further improvement using the same method. The process is repeated several times until the resulting set of satellites shows a consistent SPS receiver clock bias, i.e. very small variations, or only two satellites remain in the set. If the faulty satellite is removed, the resulting set of satellites will exhibit a smaller SPS receiver clock bias variation. The process is explained below.

For example, assume we have a set of N satellites, $(S_1, \ldots, S_N)$, we denote the estimated SPS receiver clock bias variation of this set as $$\tau_{rms} = \frac{1}{N}\sqrt{\sum_{i=1}^{N}(\tau_i - \bar{\tau})^2} \text{ where } \bar{\tau} = \frac{1}{N}\sum_{i=1}^{N}\tau_i$$

is the unbiased sample mean of SPS receiver clock bias and $\tau$ is the estimate of SPS receiver clock bias of the i th satellite by the receiver.

We start with combination $(S_1, \ldots, S_{N-1})$ and find its SPS receiver clock bias, $$\bar{\tau}_{rms}\Big|_{i \in \{1,N\}-\{i=N\}}.$$

we repeat the process for different combinations of N−1 satellites out of N satellites and acquire a set of $$\bar{\tau}_{rms}\Big|_{i \in \{1,N\}-\{i=l\}} s.$$

We can then select the set with minimum $$\bar{\tau}_{rms}\Big|_{i \in \{1,N\}-\{i=l\}}$$

as the best possible set of satellites.

We then conclude that the I th satellite, $S_I$, is satellite with the most inaccurate estimate of SPS receiver clock bias and can be removed from the set of visible satellites in order to improve the accuracy of the estimate of SPS receiver clock bias and ultimately to improve the accuracy of the estimation of the end-user location.

By removing the most inaccurate satellite from each set, we can improve the estimate of the SPS receiver clock bias. The process can be repeated until the SPS receiver clock bias variation is sufficiently small to ensure the needed consistency for location determination or there are only two satellites remaining Values of receiver clock bias variance between 0 and 5 can be acceptable.

Another embodiment of the disclosure describes a different method to assess the quality of the current set of satellites and to remove a satellite with the most inaccurate SPS receiver clock bias estimate from the current set. The embodiments use statistical parameters obtained from a set of receiver clock bias estimates to find and remove a satellite with an erroneous receiver clock bias estimate. In order to do so, the embodiments propose to analyze the set of receiver clock bias estimates and pick one which is an outlier to the current set and remove the corresponding satellite from the current set of satellites. This statistical analysis can be performed on any location within the defined region around IEL. This method reduces the computational cost of searching through all possible subsets of a set of SPS measurements.

Assume we have N satellites with estimates of SPS receiver clock bias estimates of $(\tau_1, \ldots, \tau_N)$. The estimate of the SPS receiver clock bias is then calculated with a sample mean as follows;

$$\hat{\tau} = \frac{1}{N} \sum_{i=1}^{N} \tau_i$$

In order to detect the satellite with the most inaccurate range estimate, we find the minimum, maximum, and median of the $(\tau_1, \ldots, \tau_N)$, denoted as $$\tau_{max} = \max(\tau_1, \ldots, \tau_N)$$

$$\tau_{min} = \min(\tau_1, \ldots, \tau_N)$$

$$\tau_{med} = \mathrm{med}(\tau_1, \ldots, \tau_N)$$

We then compare the two values of $|\tau_{max} - \tau_{med}|$ to $|\tau_{min} - \tau_{med}|$. If $|\tau_{max} - \tau_{med}| > |\tau_{min} - \tau_{med}|$, we pick the satellite with maximum SPS receiver clock bias and remove that satellite from our set. Otherwise, we remove the satellite with minimum SPS receiver clock bias from our set of satellites.

It is also possible to identify the worst satellite (in terms of SPS receiver clock bias error) from a set without repeating the process for all the subsets. For this purpose, suppose we have N estimates of the SPS receiver clock bias, $$\tau_i \quad i \in \{1 \ldots N\}.$$

We first calculate the median of the set, $\tau_{med}$.

Then we find the maximum and minimum estimates, denoted by $\tau_{max}$ and $\tau_{min}$. We then find the two variables defined as:

$$p_1 = |\tau_{max} - \tau_{med}|$$

$$p_2 = |\tau_{min} - \tau_{med}|$$

If any of the pointers is more than certain threshold, i.e. $p_1 > \eta$ or $p_2 > \eta$, We take the maximum variable and remove the satellite corresponding to that estimate of SPS receiver clock bias. If $p_1 > p_2$ we select the satellite with maximum SPS receiver clock bias estimate and remove it from the current set of satellites. Otherwise, we select the satellite with minimum SPS receiver clock bias estimate and remove it from the current set of satellites.

If they are both below a threshold, i.e. $p_1 \leq \eta$ and $p_2 \leq \eta$, we proceed as following; if $p_1 \gg p_2$, i.e. $p_1$ is twice as large as $p_2$, we select the satellite with maximum SPS receiver clock bias estimate and remove it. Otherwise, if $p_2 \gg p_1$, we select the satellite with minimum SPS receiver clock bias estimate and remove it. If they are approximately on the same level, $p_1 \approx p_2$, the estimate of SPS receiver clock bias is good enough and there is no need to remove any satellite.

Other embodiments of this disclosure describe a new technique in an integrated hybrid positioning environment, including an initial estimated location (IEL) along with its expected error, i.e. QoS, and SPS satellite information and range measurements, to obtain a more accurate estimate of the receiver location. In order to do so, the method combines an aggregate or group of locations with small variations of SPS receiver clock bias to obtain a more accurate location. Specifically, all possible locations are examined and only those locations with a small receiver clock bias variation are selected. Then those selected locations are combined to determine a final location.

As described above, in order to refine the IEL with SPS measurements, the hybrid positioning system constructs a region centered on the IEL, calculates the variations of SPS receiver clock bias for all the locations inside the region, and selects the location with the minimum variation. Then, a second search is initiated through the locations inside the region and those locations whose SPS receiver clock biases are sufficiently small (i.e. locations with small clock variations) are selected. The current hybrid positioning uses the location with the absolute minimum of clock variation as its final reported location. The threshold to detect if a location has small SPS receiver clock bias is dependent on the QoS of SPS, QoS of IEL, statistics of the current set of receiver clock bias estimates, and desired level of accuracy.

In this disclosure we propose that the final estimate of the user location can then be computed from all these selected locations, because they are representing all the possible solutions for a receiver location. A simple combination method to obtain the final location is to average the locations with small SPS receiver clock bias variations. Other sophisticated methods such as weighted averaging are also possible.

In order to proceed to finding the final estimated hybrid location, note that each location inside the constructed region is associated with an SPS receiver clock bias. We can classify each location based on the value of its SPS receiver clock bias as depicted in FIG. 8. FIG. 8 represents the values for SPS receiver clock bias variation for a sample point for the specified region. The center of the region is provided by the IEL and the region is constructed by hybrid positioning system around the IEL. For each grid-location inside the region, the hybrid positioning system calculates the SPS receiver clock bias variation and represents its value with a color. The darker colors are used for small variations while lighter colors are for large variations. Since the system is interested in grid-locations with small variation, it has to select all the grid-locations which are marked by darker colors.

As shown in FIG. 8, we are interested in the set of locations with small SPS receiver clock bias variation, illustrated by darker colors in the figure. The set of such locations can be denoted by R to show that there is an area in the region which includes such locations. The final estimate of receiver location is then calculated as $$X_t = \frac{1}{N} \sum_{i=1}^{N} X_i$$

$$Y_t = \frac{1}{N} \sum_{i=1}^{N} Y_i \quad (X_i, Y_i, Z_i) \in R$$

$$Z_t = \frac{1}{N} \sum_{i=1}^{N} Z_i$$

For the best result in the implementation of the disclosed methods, when the three dimensional search through all locations is performed we start with an empty array and each new location which fits into this description, i.e. exhibits small variation in SPS receiver clock bias, can be appended to the array.

Other embodiments of this disclosure describe a new technique in an integrated hybrid positioning environment, including an initial estimated location (IEL) along with its expected error and SPS satellite information and range measurements, to speed up the process of location estimation. In order to do so, the method proposes to modify the three dimensional search and perform three two dimensional searches which consequently reduces the number of searches.

Exhaustive searching through all the locations for the location with minimum SPS receiver clock bias variation is a power consuming function which puts a considerable burden on the device's CPU and can slow down the process of positioning. For a region having a size of 200 meters with a step size of 10 meters, the processor has to search through 8000 locations and calculate the SPS receiver clock bias for each location and find the location with minimum SPS receiver clock bias variations which can take up to several seconds with current processors used in small mobile devices.

The present embodiment describes a method to reduce the size of a search for a given region size with specific number of locations. The 3D-search has to perform a search in all three local dimensions, namely X, Y, and Z.

In order to obtain SPS receiver clock bias, for each location we have to find the individual clock biases from the location to each satellite. If we name the location by $G_{ijk}$ notation (i.e. location i from X axis, j from Y axis, and k from Z axis), we can formulate the problem as following;

$$\bar{\tau}_{ijk} = \frac{\sum_{m=1}^{n} \tau_m^{ijk}}{n}$$

where $\bar{\tau}_{ijk}$ presents the unbiased estimate of SPS receiver clock bias at $G_{ijk}$, $\tau_m^{ijk}$ represents GPS receiver clock bias of $G_{ijk}$ from m th satellite, and n is the number of visible satellites.

Similar to the above methods, we define SPS receiver clock bias variation as;

$$\bar{\tau}_{ijk}^{rms} = \frac{\sqrt{\sum_{m=1}^{n} (\tau_m^{ijk} - \bar{\tau}_{ijk})^2}}{n}$$

which provides information about the deviation of the individual SPS receiver clock biases from the best estimate of SPS receiver clock bias, $\bar{\tau}_{ijk}$.

In traditional hybrid positioning system, the location with minimum $\bar{\tau}_{ijk}^{rms}$ is the solution to hybrid positioning problem. Mathematically, $$(\hat{x}, \hat{y}, \hat{z}) = \underset{G_{ijk}}{\arg\min}(\tau_{ijk}^{rms}) = \left\{ G_{IJK} \mid \tau_{IJK}^{rms} = \underset{ijk}{\arg\min}(\tau_{ijk}^{rms}) \right\}$$

where $(\hat{x}, \hat{y}, \hat{z})$ represents the x, y, and z coordinates of the refined estimate.

We propose to find the aggregate of locations with sufficiently small $\bar{\tau}_{ijk}^{rms}$ and use this aggregate set to refine the initial position using following;

$$X_t = \frac{1}{N} \sum_{i=1}^{N} X_i$$

$$Y_t = \frac{1}{N} \sum_{i=1}^{N} Y_i \quad (X_i, Y_i, Z_i) \in R$$

$$Z_t = \frac{1}{N} \sum_{i=1}^{N} Z_i$$

this method is referred to as 3D search.

The 3D search requires to search over all possible i, j, and k.

Instead of performing a complete three dimensional search, this invention proposes to perform 2D-searches in all three dimensions. The 2D-searches are performed in XY dimension (XY plane), XZ dimension (XZ plane), and YZ dimension (YZ plane).

The number of searches in each 2D-search is smaller than the total number of searches in 3D-search, by order of the number of grid-locations in one direction. For a region size of 200 with step size of 10, we can perform a 20×20=400 search in each dimension. The total number of searches then reduces to 400×3=1200 instead of original 8000 searches. The resulting locations from each 2D-search which has the minimum SPS receiver clock bias can then be used to find the final estimate of the location of the receiver using the following;

$$X_t = \frac{X_1 + X_2 + X_3}{3}$$

$$Y_t = \frac{Y_1 + Y_2 + Y_3}{3}$$

$$Z_t = \frac{Z_1 + Z_2 + Z_3}{3}$$

where $(X_1, Y_1, Z_1)$ is the location with minimum SPS receiver clock bias in XY 2D-search, $(X_2, Y_2, Z_2)$ is the location with minimum SPS receiver clock bias in XZ 2D-search, and $(X_3, Y_3, Z_3)$ is the location with minimum SPS receiver clock bias in YZ 2D-search.

Mathematically;

$$(X_1, Y_1, Z_1) = \underset{G_{ij,k=0}}{\arg\min}(\tau_{ij,k=0}^{rms})$$

$$= \left\{ G_{IJ,K=0} \mid \tau_{IJ,K=0}^{rms} = \underset{ij,k=0}{\arg\min}(\tau_{ij,k=0}^{rms}) \right\}$$

$$(X_2, Y_2, Z_2) = \underset{G_{ik,j=0}}{\arg\min}(\tau_{ik,j=0}^{rms})$$

$$= \left\{ G_{IK,J=0} \mid \tau_{IK,J=0}^{rms} = \underset{ik,j=0}{\arg\min}(\tau_{ik,j=0}^{rms}) \right\}$$

$$(X_3, Y_3, Z_3) = \underset{G_{jk,i=0}}{\arg\min}(\tau_{jk,i=0}^{rms})$$

$$= \left\{ G_{JK,I=0} \mid \tau_{JK,I=0}^{rms} = \underset{jk,i=0}{\arg\min}(\tau_{jk,i=0}^{rms}) \right\}$$

Figure 9:
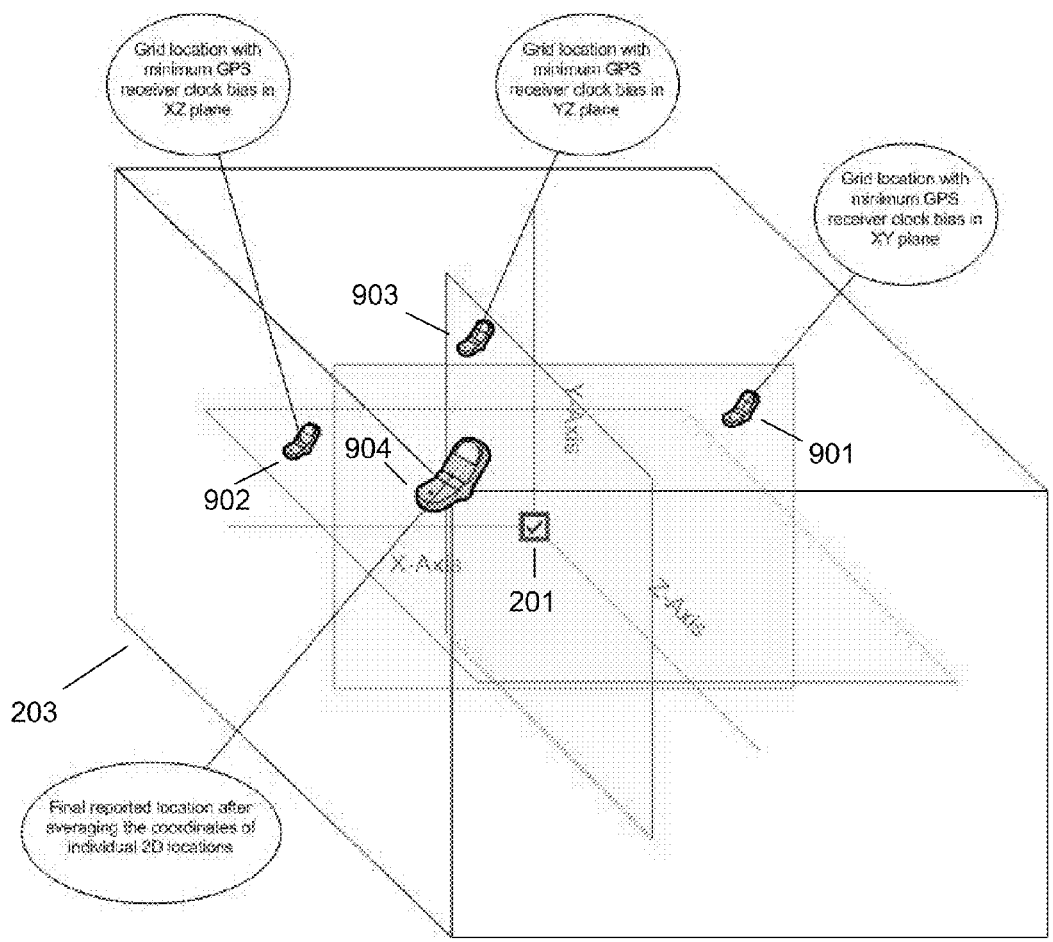
FIG. 9 depicts a two dimensional averaging method, according to one embodiment of the present disclosure.

FIG. 9 depicts this 2D search method. The IEL 201 is provided by WLAN-PS and hybrid positioning system constructs the region 203. The hybrid positioning system then calculates the variation for all grid-locations on the XY-plane and finds the grid location with minimum variation 901. The process is repeated for XZ-plane and YZ-plane to find the best estimates on those planes 902 and 903. The system then average the three estimates 901, 902, and 903 to obtain the final estimate 904. It can be observed that each 2D search consumes less time, by an order of number of locations in one dimension. The total number of searches is then three times the number of searches in a 2D search. Therefore, the receiver clock bias variation within the region can be calculated in less time and consuming less computational power by using the 2D method as opposed to the 3D method. The 2D search is less time consuming and more computationally efficient. However, the accuracy of 3D search is better than 2D search.

The many features and advantages of the embodiments of the present invention are apparent from the detail specification, and thus, it is intended to cover all such features and advantages of the invention that fall within the true spirit and scope of the invention. All suitable modifications and equivalents maybe resorted to, falling within the scope of the invention.

What is claimed is:

1. A method for determining the position of a WLAN positioning system (WPS) and satellite positioning system (SPS) enabled device comprising:
   determining an initial WPS position of the device using WPS;
   calculating an error region around the initial WPS position of the device;
   dividing the error region into a plurality of points;
   obtaining satellite measurements from at least two satellites in view of the device;
   determining a variation in a receiver clock bias for each point within the error region based on the satellite measurements from at least two satellites;
   selecting the point with the lowest variation in the receiver clock bias; and
   determining whether or not to use the point with the lowest variation in receiver clock bias to refine the initial WPS position of the device.

2. The method of claim 1, wherein the variation in the receiver clock bias is calculated according to the following formula:

$$\bar{\tau}_{rms} = \frac{1}{N}\sqrt{\sum_{i=1}^{N}(\tau_i - \bar{\tau})^2}$$

$$\text{where } \bar{\tau} = \frac{1}{N}\sum_{i=1}^{N}\tau_i$$

is an unbiased sample mean of the receiver clock bias and $\tau_i$ is the receiver clock bias for the ith satellite.

3. The method of claim 1 wherein determining whether or not to use the point with the lowest variation in receiver clock bias to refine the initial WPS position of the device comprises rejecting the point with the lowest receiver clock bias variation if the point is located on an edge of the error region.

4. The method of claim 1, wherein determining whether or not to use the point with the lowest variation in receiver clock bias to refine the initial WPS position of the device comprises rejecting the satellite measurements if the region displays monotonicity.

5. The method of claim 1, wherein determining whether or not to use the point with the lowest variation in receiver clock bias to refine the initial WPS position of the device comprises rejecting a point having a large variation in receiver clock bias.

6. The method of claim 5, wherein a large variation in receiver clock bias comprises 20 and greater.

7. The method of claim 5 comprising evaluating the accuracy of individual satellite measurements in order to lower the variation in the receiver clock bias for a set of satellites, wherein the number of satellites is greater than two.

8. The method of claim 7 wherein evaluating the accuracy of individual satellite measurements comprises:
   grouping the satellites into sub-groups of two or more satellites;
   determining a variation in receiver clock bias for each of the sub-groups;
   comparing the variation of receiver clock bias in the sub-groups to select a sub-group with a minimum SPS receiver clock bias variation; and
   determining an individual satellite measurement with an inaccurate receiver clock bias estimate as the satellite which was excluded from the sub-group selected in the previous step.

9. The method of claim 7 comprising:
   determining a minimum value of the receiver clock bias;
   determining a maximum value of the receiver clock bias;
   determining a median value of the receiver clock bias;
   comparing the difference between the minimum value and median and maximum value and median and selecting the larger of these two differences; and
   determining an individual satellite measurement with an inaccurate receiver clock bias estimate as the satellite which corresponded to the larger selected value in the previous step.

10. The method of claim 7 comprising discarding satellite measurements from satellites that have inaccurate receiver clock bias estimates.

11. The method of claim 1, determining whether or not to use the point with the lowest variation in receiver clock bias as a refined estimate of the initial WPS position of the device comprises accepting a point having a small receiver clock bias.

12. The method of claim 11, wherein a small variation comprises a value between 0 and 5.

13. The method of claim 1 comprising determining that the WPS position is a final location of the device if no minimum of receiver clock bias variation exists in the error region.

14. The method of claim 1 comprising determining that the WPS position is a final location of the device if value of SPS receiver clock bias was large.

15. The method of claim 1, wherein the satellite measurements are obtained from at least three satellites.

16. The method of claim 1, wherein the satellite measurements are obtained from more than three satellites.

17. A method for determining the position of a WLAN positioning system (WPS) and satellite positioning system (SPS) enabled device comprising:
   determining an initial WPS position of the device using WPS;
   calculating an error region around the initial WPS position of the device;
   dividing the error region into a plurality of points;
   obtaining satellite measurements from at least two satellites in view of the device;
   determining a variation of a SPS receiver clock bias for each point within the error region based on the satellite measurements from at least two satellites;
   selecting a group of points with the lowest variation in the receiver clock bias; and
   determining a new refined position based on the group of points.

18. The method of claim 17, wherein the refined location is computed as an average of all the group of points using the following equations:

$$X_t = \frac{1}{N}\sum_{i=1}^{N} X_i$$

$$Y_t = \frac{1}{N}\sum_{i=1}^{N} Y_i \quad (X_i, Y_i, Z_i) \in R$$

$$Z_t = \frac{1}{N}\sum_{i=1}^{N} Z_i$$

19. The method of claim 18, wherein the refined location is computed as a weighted average of all the aggregate points.

* * * * *